US009341913B2

(12) United States Patent
Milliron et al.

(10) Patent No.: US 9,341,913 B2
(45) Date of Patent: May 17, 2016

(54) NANOSTRUCTURED TRANSPARENT CONDUCTING OXIDE ELECTROCHROMIC DEVICE

(75) Inventors: Delia Milliron, Oakland, CA (US); Ravisubhash Tangirala, Mountain View, CA (US); Anna Llordes, Berkeley, CA (US); Raffaella Buonsanti, Oakland, CA (US); Guillermo Garcia, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 47 days.

(21) Appl. No.: 14/240,689

(22) PCT Filed: Aug. 21, 2012

(86) PCT No.: PCT/US2012/051757
§ 371 (c)(1),
(2), (4) Date: Nov. 7, 2014

(87) PCT Pub. No.: WO2013/032790
PCT Pub. Date: Mar. 7, 2013

(65) Prior Publication Data
US 2015/0109652 A1    Apr. 23, 2015

Related U.S. Application Data

(60) Provisional application No. 61/528,124, filed on Aug. 26, 2011.

(51) Int. Cl.
*G02F 1/155* (2006.01)
*E06B 9/24* (2006.01)
(Continued)

(52) U.S. Cl.
CPC ................. *G02F 1/155* (2013.01); *B82Y 20/00* (2013.01); *E06B 9/24* (2013.01); *G02F 1/163* (2013.01);
(Continued)

(58) Field of Classification Search
CPC ......... B82Y 20/00; G02F 1/155; G02F 1/163; G02F 2001/1519; G02F 1/1523; G02F 2203/10; G02F 2202/36; G02F 2001/1555; G02F 2203/11; E06B 9/24; E06B 2009/2464; E06B 2009/24; Y10S 977/932; Y10S 977/762
See application file for complete search history.

(56) References Cited

U.S. PATENT DOCUMENTS 5,379,146 A    1/1995 Defendini
5,995,273 A   11/1999 Chandrasekhar
(Continued)

FOREIGN PATENT DOCUMENTS

WO    2013016318 A2    1/2013

OTHER PUBLICATIONS

Pflughoefft, M. et al. (2002). "Spectroelectrochemical Analysis of the Electrochromism of Antimony-Doped Nanoparticulate Tin-Dioxide Electrodes" J. Phys. Chem. 106:10530-10534.
(Continued)

*Primary Examiner* — David N Spector
(74) *Attorney, Agent, or Firm* — Lowenstein Sandler LLP

(57) ABSTRACT

The embodiments described herein provide an electrochromic device. In an exemplary embodiment, the electrochromic device includes (1) a substrate and (2) a film supported by the substrate, where the film includes transparent conducting oxide (TCO) nanostructures. In a further embodiment, the electrochromic device further includes (a) an electrolyte, where the nanostructures are embedded in the electrolyte, resulting in an electrolyte, nanostructure mixture positioned above the substrate and (b) a counter electrode positioned above the mixture. In a further embodiment, the electrochromic device further includes a conductive coating deposited on the substrate between the substrate and the mixture. In a further embodiment, the electrochromic device further includes a second substrate positioned above the mixture.

15 Claims, 21 Drawing Sheets

(51) Int. Cl.
G02F 1/163 (2006.01)
B82Y 20/00 (2011.01)
G02F 1/15 (2006.01)

(52) U.S. Cl.
CPC . E06B 2009/2405 (2013.01); E06B 2009/2464 (2013.01); G02F 1/1523 (2013.01); G02F 2001/1519 (2013.01); G02F 2001/1555 (2013.01); G02F 2202/36 (2013.01); G02F 2203/10 (2013.01); G02F 2203/11 (2013.01); Y10S 977/762 (2013.01); Y10S 977/932 (2013.01)

(56) References Cited

U.S. PATENT DOCUMENTS

| | | | |
|---|---|---|---|
| 6,712,999 | B2 | 3/2004 | Haering et al. |
| 6,861,014 | B2 | 3/2005 | Fitzmaurice et al. |
| 7,521,005 | B2 | 4/2009 | Kwon et al. |
| 7,522,329 | B2 | 4/2009 | Brabec et al. |
| 2007/0138941 | A1 | 6/2007 | Jin et al. |
| 2007/0182705 | A1 | 8/2007 | Leyland et al. |
| 2007/0237898 | A1 | 10/2007 | Hoeing |
| 2008/0166551 | A1 | 7/2008 | Sasa et al. |
| 2008/0304132 | A1 | 12/2008 | Jung et al. |
| 2009/0097096 | A1 | 4/2009 | Noh et al. |
| 2009/0168139 | A1 | 7/2009 | Hayashi et al. |
| 2009/0231664 | A1 | 9/2009 | Shibuya et al. |
| 2010/0039690 | A1 | 2/2010 | Agrawal et al. |
| 2011/0048614 | A1 | 3/2011 | Veerasamy |
| 2015/0062687 | A1* | 3/2015 | Milliron ............... G02F 1/1508 359/275 |

OTHER PUBLICATIONS

European Search Report for EP Application No. 12828240.7, mailing date of Mar. 4, 2015, 9 pages.
Milliron, D. et al. (Sep. 6, 2010) "Electrochromism of Nanostructured Films of Transparent Conducting Oxides", The Molecular Foundry and Environmental Energy Technologies Division, Lawrence Berkeley National Laboratory, 16 pages.
International Search Report and Written Opinion for PCT Patent Application No. PCT/US2012/051757, filed Aug. 21, 2012, 4 pages.
Choi, S-II. et al., (2008). "Preparation and Optical Properties of Colloidal, Monodisperse, and Highly Crystalline ITO Nanoparticles," Chem. Mater. 20:2609-2611.
Garcia, G. et al. (2011). "Dynamically Modulating the Surface Plasmon Resonance of Doped Semiconductor Nanocrystals," Nano Letters, 11:4415-4420.
International Preliminary Report on Patentability for PCT Patent Application No. PCT/US2012/051757, filed Aug. 21, 2012, 8 pages.
Link, S. et al. (1999). "Spectral properties and relaxation dynamics of surface plasmon electronic oscillations in gold and silver nanodots and nanorods." J. Phys. Chem. B. 103, 8410-8426.
Liu, N. et al. (2011). "Nanoantenna-enhanced gas sensing in a single tailored nanofocus." Nature Mater. 10, 631-636.
Larsson, E. M. et al. (2009) "Nanoplasmonic probes of catalytic reactions." Science. 326, 1091-1094.
Elghanian, R. et al. (1997) "Selective colorimetric detection of polynucleotides based on the distance-dependent optical properties of gold nanoparticles." Science. 277, 1078-1081.
Atwater, H. A. et al. (2010) "Plasmonics for improved photovoltaic devices." Nature Mater. 9, 205-213.
Gilstrap, R. A. et al. (2008) "Synthesis of a nonagglomerated indium tin oxide nanoparticle dispersion." Adv. Mater. 20, 4163-4166.

Kanehara, M. et al. (2009) "Indium tin oxide nanoparticles with compositionally tunable surface plasmon resonance frequencies in the near IR region." J. Am. Chem. Soc. 131, 17736-17737.
Luther, M. J. et al. (2011) "Localized surface plasmon resonance arising from free carriers in doped quantum dots." Nature Mater. 10, 361-366.
Dorfs, D. et al. (2011) "Reversible Tunability of the Near-Infrared Valence Band Plasmon Resonance in Cu2-xSe Nanocrystals." J. Am. Chem. Soc. 133, 11175-11180.
Wang, C. et al. (2001) "Electrochromic nanocrystal quantum dots." Science. 291, 2390-2392.
Guyot-Sionnest, P. et al. (2003) "Fast voltammetric and electrochromic response of semiconductor nanocrystal thin films." J. Phys. Chem. B 107, 7355-7359.
Ung, T., et al. (1997) "Spectroelectrochemistry of Colloidal Silver." Langmuir. 13, 1773-1782.
Novo, C. et al. (2009) "Electrochemical Charging of Single Nanorods." J. Am. Chem. Soc. 131, 14664-14666.
Boltasseva, A. et al. (2011) "Low-Loss Plasmonic Metamaterials." Science. 331, 290.
Yamada, N. et al. (2000) "Donor compensation and carrier-transport mechanism in tin doped In2O3 films studied by means of conversion electron119Sn Mossbauer spectroscopy and hall effect measurement." Jpn. J. Appl. Phys. 39, 4158-4163.
Zarghami, M. H. et al. (2010) "P-Type PbSe and PbS quantum dot solids prepared with short chain acids and diacids." ACS Nano. 4, 2475-2585.
Ederth, J. et al. (2003) "Indium tin oxide films made from nanoparticles: Models for the optical and electrical properties." Thin Solid Films. 445, 199-206.
Solieman, A. et al. (2005) "Modeling of optical and electrical properties of In2O3:Sn coatings made by various techniques." Thin Solid Films. 502, 205-211.
Ghosh, S. K. et al. (2007) "Interparticle coupling effect on the surface plasmon resonance of gold nanoparticles: From theory to application." Chem. Rev. 107, 4797-4862.
Halas, N. J. et al. (2011) "Plasmons in strongly coupled metallic structures." Chem. Rev. 111, 3913-3961.
Zum Felde, U. et al. (2000) "Electrochromism of highly doped nanocrystalline SnO:Sb." J. Phys. Chem. B. 104, 9388-9395.
Feiganbaum, E. et al. (2010) "Unity-order index change in transparent conducting oxides at visible frequencies." Nano Lett. 10, 21112116.
Lee, E. S. et al. (2006) "Advancement in Electrochromic Windows" (CEC-500-2006-052, California Energy Commission, PIER, Lawrence Berkeley National Laboratory, Berkeley, CA).
Baetens, R. et al. (2010) "Propeties, requirements and possibilities of smart windows for dynamic daylight and solar energy control in buildings: A state-of-the art review." Sol. Energ. Mat. Sol. C. 94, 87-105.
Lee, S.E. et al. (2005) "Solid state nanocomposite electrochromic pseudocapacitors." Electrochem. Sol. Stat. Lett. 8, A188-A190.
O'Leary, S. K. et al. (1997) "The relationship between the distribution of electronic states and the optical absorption spectrum of an amorphous semiconductor: An empirical analysis." J. Appl. Phys. 82, 3334-3340.
Mergel, D. et al. (2002) "Dielectric modelling of optical spectra of thin In2O3:Sn films." J. Phys. D. 35, 794-801.
Hamberg, I. et al. (1986) "Evaporated Sn-doped In2O3 films—basic optical-properties and applications to energy-efficient windows." J. Appl. Phys. 60, 123-159.
Gerlach, E. (1986) "Carrier scattering and transport in semiconductors treated by the energy-loss method." J. Phys. C. 19, 4585-4603.

* cited by examiner

Thermogravimetric analysis of formic acid in nitrogen enviornment at a heating rate of 5°C/min.

Sheet resistance as a function of annealing temperature for two sets of 11.6±1.5 nm ITO nanocrystal films with 9.4% tin-doping.

Cyclic voltammogram of an ITO nanocrystal film in 0.1M $LiClO_4$/propylene carbonate electrolyte. Ten cycles are shown. Average charge/discharge of 3.5±0.5 mC was witnessed between each cycle. All potentials referenced to a $Li/Li^+$ electrode.

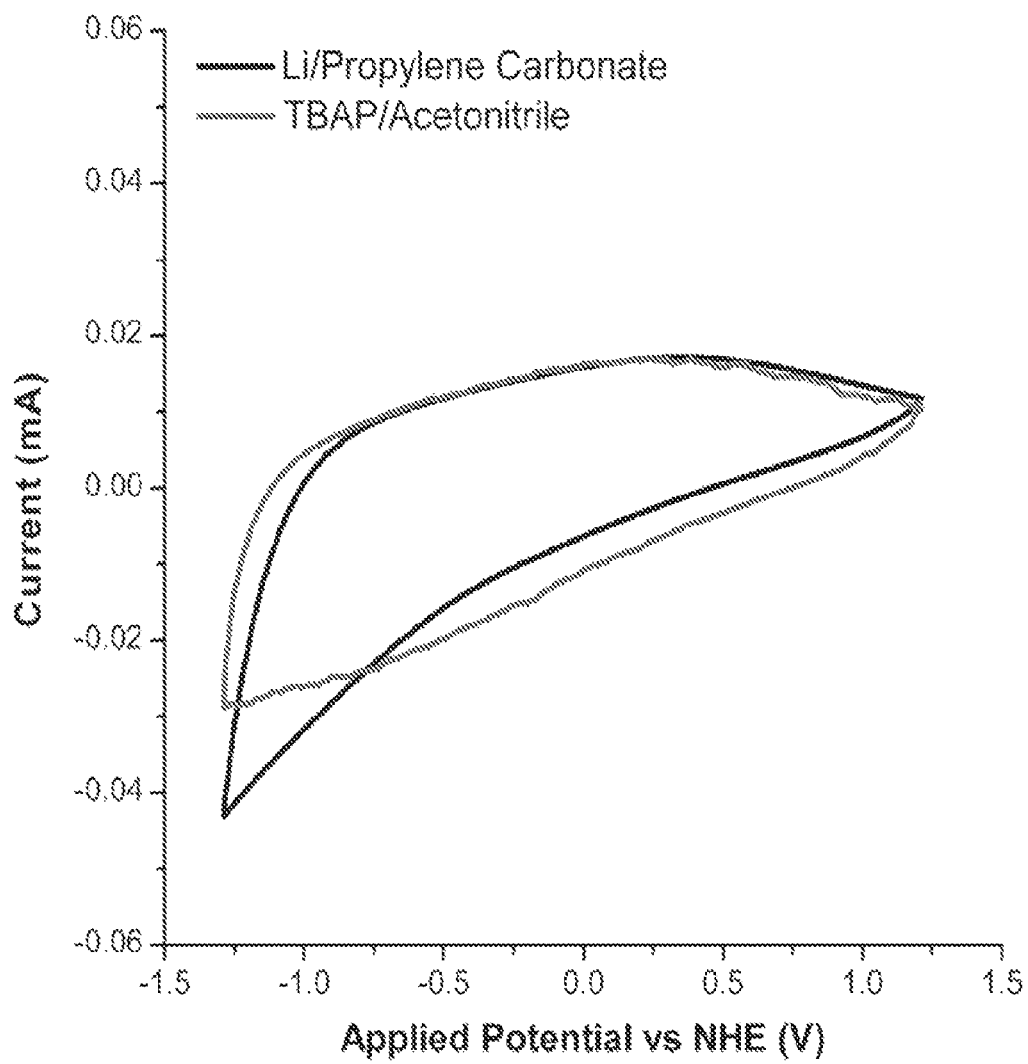

Cyclic voltammograms of an ITO nanocrystal film in: 0.1M LiClO$_4$ in propylene carbonate electrolyte (black), 0.1M tetrabutylammonium perchlorate in acetonitrile (TBAP) electrolyte (red). Average chage/discharge of 3.5±0.5 mC and 3.3±0.4 mC was witnessed between each Li$^+$ and TBAP cycle respectively. For clear comparison, all potentials are reported versus the normal hydrogen electrode (NHE).

FIG. 10

Transmittance spectra of ITO nanocrystal film in the colored (-1.3V vs NHE) and bleached (1.2V vs NHE) state in: 0.1M LiClO4 in propylene carbonate electrolyte (black), 0.1M tetrabutylammonium perchlorate in acetonitrile electrolyte.

Coloration efficiency of ITO nanocrystal film driven between 4V (bleached) and 1.5V (colored) versus Li/Li+ electrode in 0.1M LiClO4 in propylene carbonate electrolyte.

NANOSTRUCTURED TRANSPARENT CONDUCTING OXIDE ELECTROCHROMIC DEVICE

RELATED APPLICATIONS

This application is a US National Stage 371 Application of PCT application No.: PCT/US2012/051757, filed Aug. 21, 2012, which claims priority to U.S. Provisional Patent Application No. 61/528,124, filed Aug. 26, 2011, which are hereby incorporated by reference in their entirety.

STATEMENT OF GOVERNMENT SUPPORT

This invention was made with government support under Contract No. DE-AC02-05CH11231 awarded by the U.S. Department of Energy. The government has certain rights in this invention.

FIELD

Embodiments described herein relate to the field of electrochromics, and particularly relate to a nanostructured transparent conducting oxide electrochromic device.

BACKGROUND

An important requirement of plasmonic switching, whether applied to macro- or micro-scale devices, is stability under repeated cycling. In fact, this is a critical factor limiting the application of many otherwise promising electrochromic technologies to smart window coatings[26].

Localized surface plasmon absorption features arise at high doping levels in semiconductor nanocrystals, appearing in the near infrared range.

BRIEF DESCRIPTION OF THE DRAWINGS

FIGS. 7A-7C, 8, 9A-9C, 10, 11, and 12 show examples of graphs of different properties of different nanocrystal films or different electrochromic devices.

DETAILED DESCRIPTION

Figure 1:
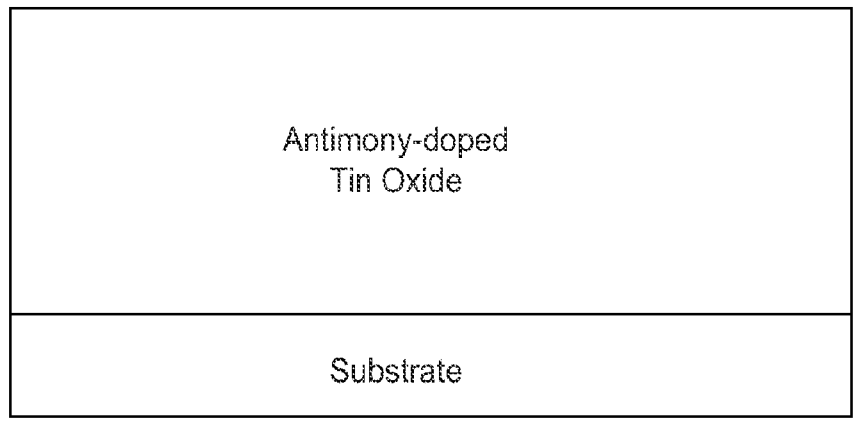
FIG. 1 shows an example of a cross-sectional diagram of a substrate and a layer of antimony-doped tin oxide disposed on a surface of the substrate.

Electrochromic devices using nanoparticles have been demonstrated before, as in U.S. Pat. No. 6,712,999. Such nanostructured electrochromic devices have used materials such as antimony-doped tin oxide. FIG. 1 shows an example of a cross-sectional diagram of a substrate and a layer of antimony-doped tin oxide disposed on a surface of the substrate. Some electrochromic films are analogous to battery electrodes.

Localized surface plasmon resonance (LSPR) features of metallic nanostructures have been leveraged for sensors, surface enhanced spectroscopy, and light-trapping in photovoltaic cells[1-5]. Unlike metals, plasmon resonance frequencies of doped semiconductors can be modified by changing the material's composition, creating new opportunities for plasmonic manipulation of light. In fact, well-defined LSPR features have recently been observed in the optical (infrared) spectra of highly doped semiconductor nanocrystals (NCs), especially transparent conducting oxides such as tin-doped indium oxide (ITO)[6-8].

These optical characteristics are of great interest since the position of the plasmon peak can be adjusted on the basis of the chemical doping level. However, chemical tuning of the plasmon is fixed by the composition of the material, which cannot generally be dynamically modified. While it was shown very recently that the LSPR of copper deficient $Cu_2S$ and $Cu_2Se$ NCs shifts in response to oxidizing or reducing chemical treatments, this composition-driven optical response relies on the unusually high mobility of $Cu^+$ ions and the mechanisms for reversing oxidative doping remain uncertain[9,10].

Electrochemical doping of CdSe NC films was previously shown to bleach the exciton peak at the onset of the visible band gap absorption and to introduce a new intraband absorption peak in the far infrared region[11,12].

In metal nanostructures (e.g., Au or Ag), acute screening by a high background charge density limits the shift of the LSPR peak to 10 or 20 nm, at most.

Hydrocarbon ligands which cap the surfaces of NCs form highly insulating barriers between adjacent NCs. Simple air annealing causes the LSPR feature to disappear, consistent with the trapping of free carriers by filling structural oxygen vacancies[16].

Electrochromic window coatings reported in the literature and now emerging on the market most strongly modulate visible light, with a more modest dynamic range for NIR transmittance[36].

Embodiments described herein provide an electrochromic device. In an exemplary embodiment, the electrochromic device includes (1) a substrate and (2) a film supported by the substrate, where the film includes transparent conducting oxide (TCO) nanostructures. In a further embodiment, the electrochromic device further includes (a) an electrolyte, where the nanostructures are embedded in the electrolyte, resulting in an electrolyte, nanostructure mixture positioned above the substrate and (b) a counter electrode positioned above the mixture. In a further embodiment, the electrochromic device further includes a conductive coating deposited on the substrate between the substrate and the mixture. In a further embodiment, the electrochromic device further includes a second substrate positioned above the mixture.

Figure 2A:
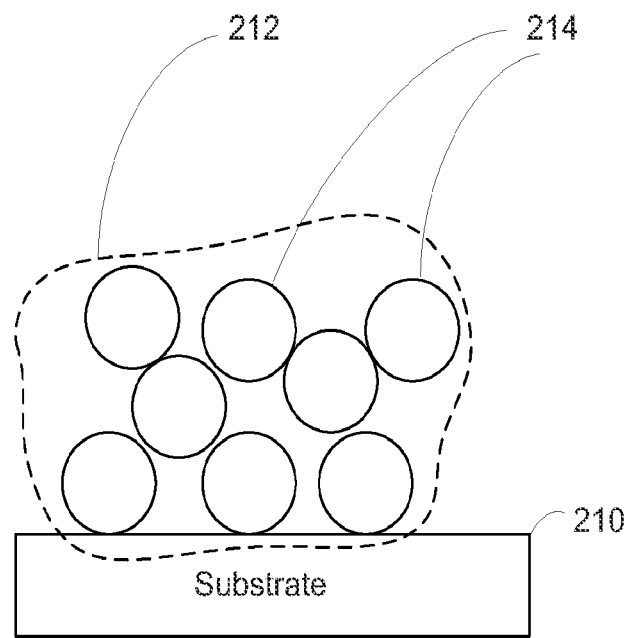
FIGS. 2A-2D show examples of cross-sectional diagrams of portions of different electrochromic devices.
Figure 2B:
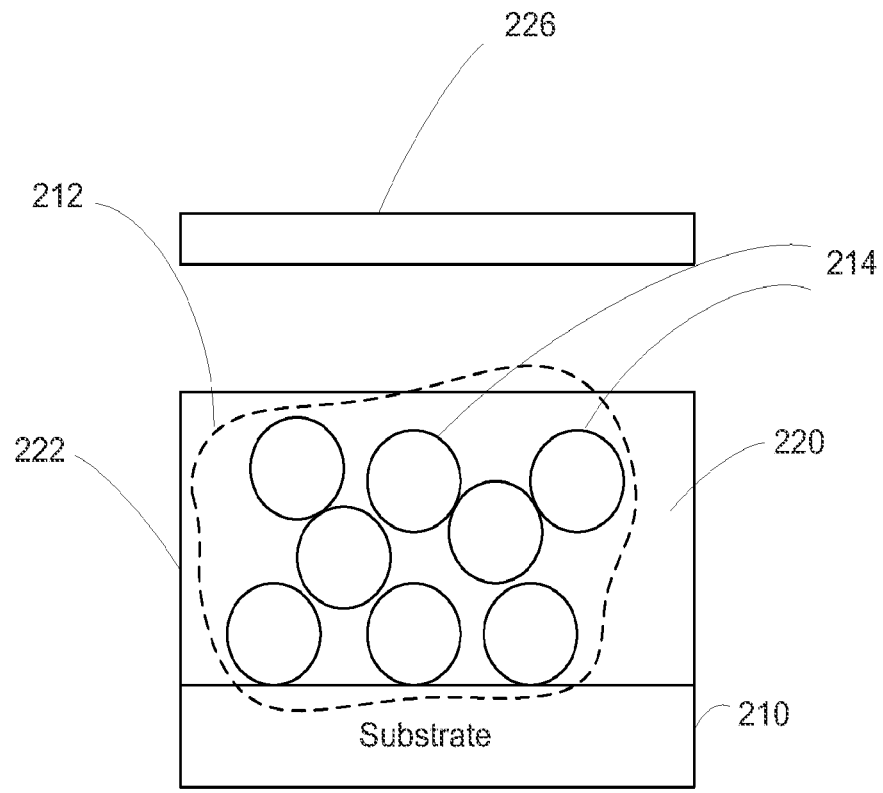
Figure 2C:
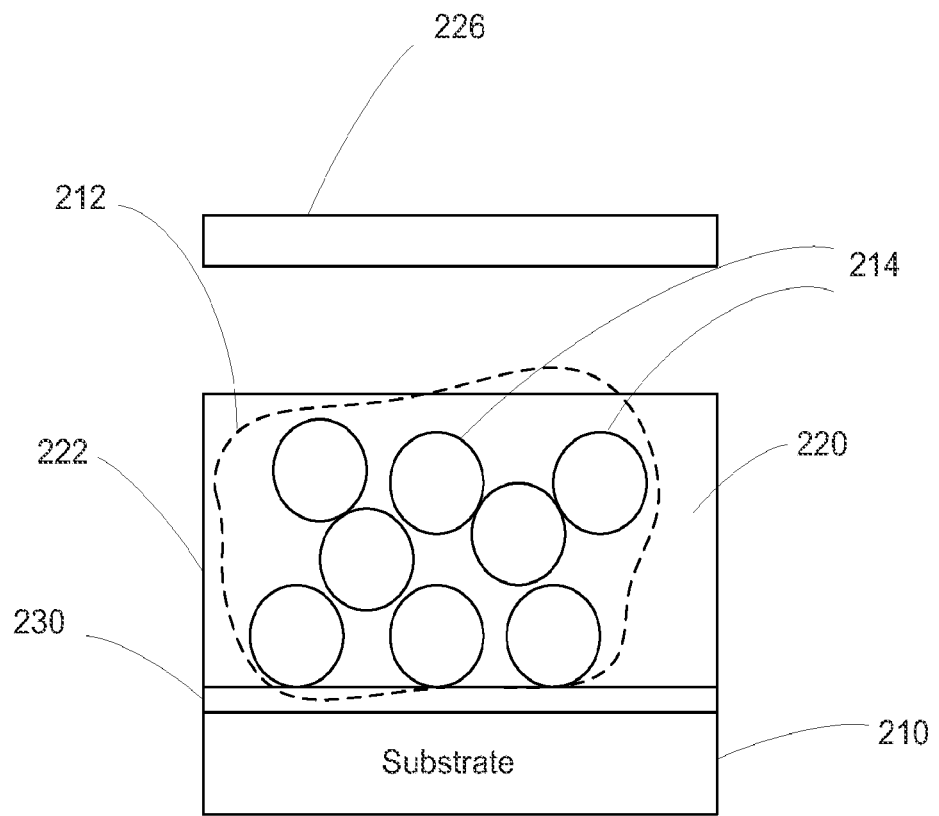
Figure 2D:
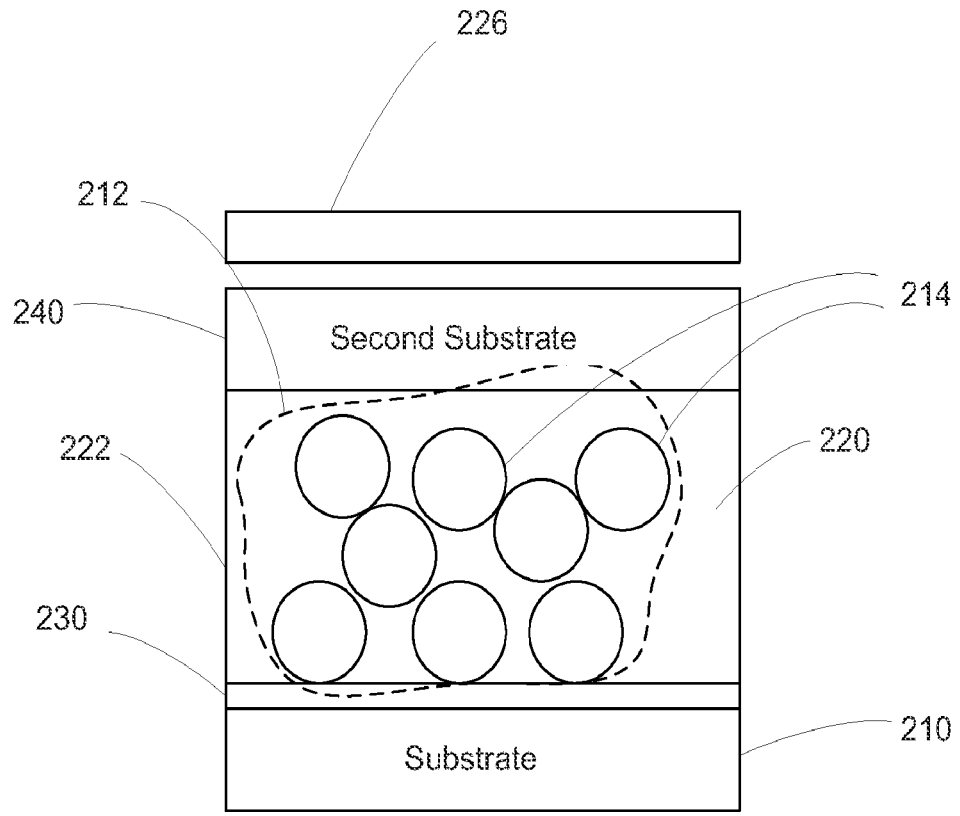

Referring to FIG. 2A, in an exemplary embodiment, the embodiment includes a substrate 210 and a film 212 supported by substrate 210, where film 212 includes transparent conducting oxide (TCO) nanostructures 214. In a further embodiment, as shown in FIG. 2B, the embodiment further includes an electrolyte 220, where nanostructures 214 are embedded in electrolyte 220, resulting in an electrolyte, nanostructure mixture 222 positioned above substrate 210 and a counter electrode 226 positioned above mixture 222. In a further embodiment, as shown in FIG. 2C, the embodiment further includes a conductive coating 230 deposited on substrate 210 between substrate 210 and mixture 222. In a further embodiment, as shown in FIG. 2D, the embodiment further includes a second substrate 240 positioned above mixture 222.

Substrate

In an exemplary embodiment, substrate 210 includes glass. In an exemplary embodiment, substrate 210 includes a transparent material. In an exemplary embodiment, substrate 210 includes plastic. In an exemplary embodiment, substrate 210 includes polyethylene terephthalate (PET).

Nanostructures

In an exemplary embodiment, nanostructures 214 include TCO nanocrystals. In an exemplary embodiment, nanostructures 214 include TCO nanowires. In an exemplary embodiment, nanostructures 214 include TCO nanorods. In an exemplary embodiment, nanostructures 214 include TCO nanoporous material.

In an exemplary embodiment, nanostructures 214 include tin-doped indium oxide (ITO). In an exemplary embodiment, nanostructures 214 include aluminum-doped zinc oxide (AZO). In an exemplary embodiment, nanostructures 214 include gallium-doped zinc oxide. In an exemplary embodiment, nanostructures 214 include indium, gallium-doped zinc oxide. In an exemplary embodiment, nanostructures 214 include indium-doped zinc oxide.

Electrolyte

In an exemplary embodiment, electrolyte 220 includes an inorganic material.

In an exemplary embodiment, electrolyte 220 includes a polymer. In an exemplary embodiment, electrolyte 220 includes a gel. In an exemplary embodiment, electrolyte 220 includes an organic liquid. In an exemplary embodiment, electrolyte 220 includes an aqueous liquid.

Counter Electrode

In an exemplary embodiment, counter electrode 226 includes an electrochromic film. In an exemplary embodiment, counter electrode 226 includes a transition metal oxide. In a particular embodiment, the transition metal oxide includes nickel oxide. In a particular embodiment, the transition metal oxide includes vanadium oxide. In a particular embodiment, the transition metal oxide includes comprises titanium oxide.

Conductive Coating

In an exemplary embodiment, conductive coating 230 includes a transparent material. In an exemplary embodiment, conductive coating 230 includes TCO. In an exemplary embodiment, conductive coating 230 includes graphene. In an exemplary embodiment, conductive coating 230 includes carbon nanorods. In an exemplary embodiment, conductive coating 230 includes metal nanowires.

EXAMPLE

Embodiments described herein will be described in greater detail by way of a specific example. The following example is offered for illustrative purposes, and is intended neither to limit nor define the embodiments described herein in any manner.

Materials and Methods

Figures 3A, 3B, 3C, 3D:
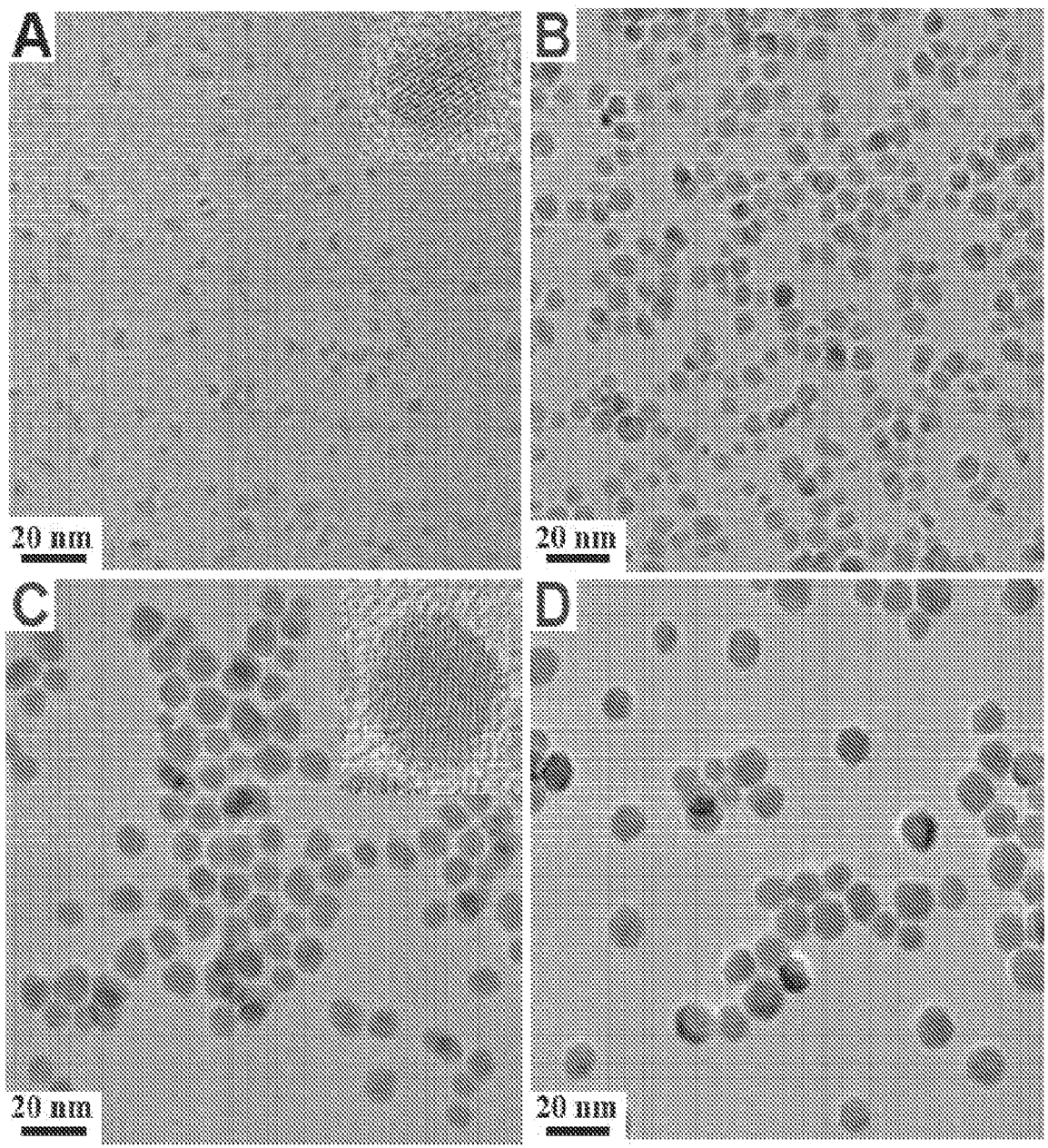
FIGS. 3A-3D show examples of micrographs of different nanocrystals.
Figure 3E:
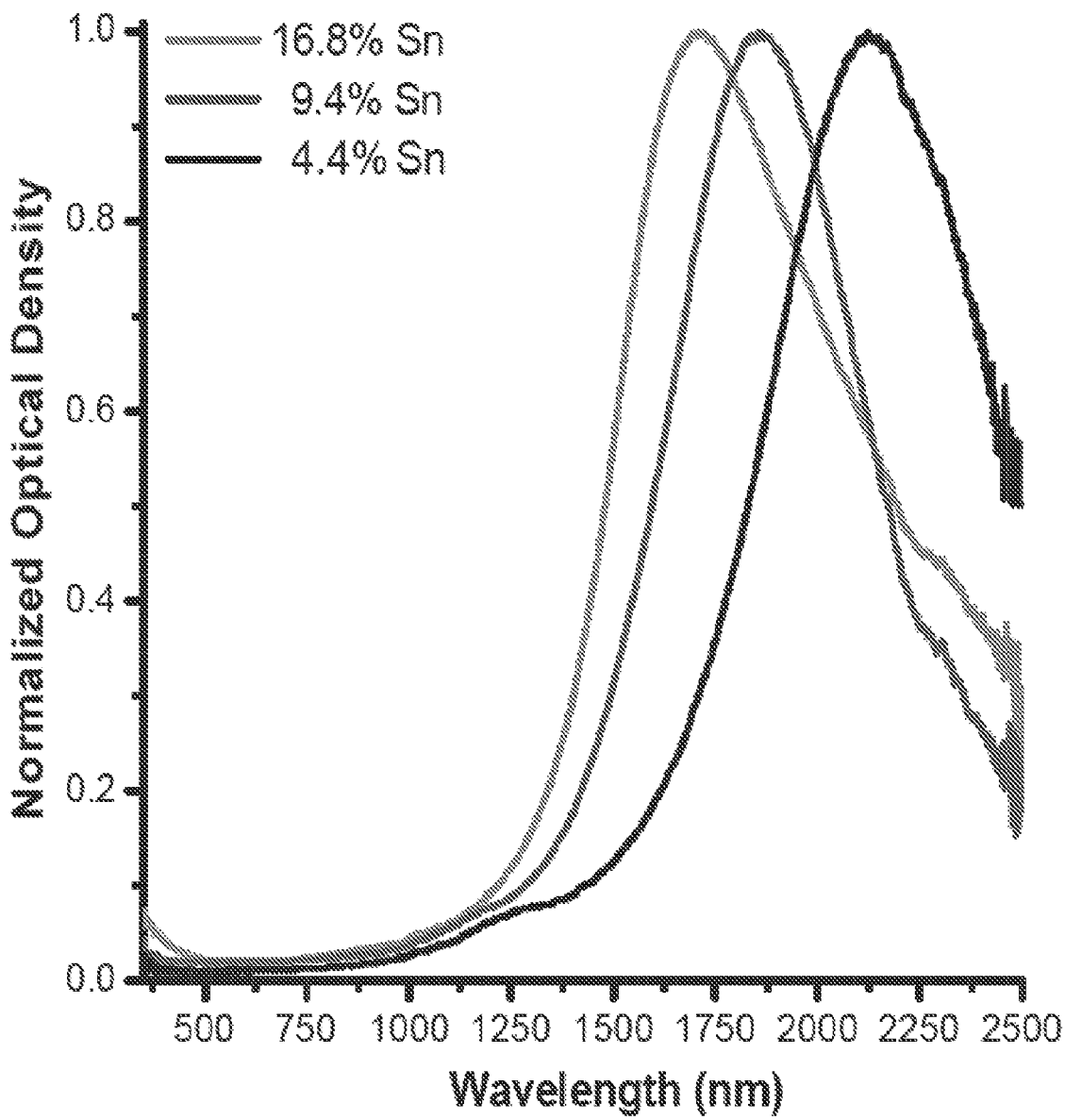
FIG. 3E shows examples of transmission spectra of the nanocrystals shown in FIGS. 3A-3D capped with organic ligands and dispersed in hydrophobic solvents.

In an exemplary embodiment, the embodiment includes synthesizing colloidal ITO NCs of variable size and doping level by balancing precursor reactivity and adjusting the indium and tin content in the feedstock, as shown in FIG. 3A, FIG. 3B, FIG. 3C, and FIG. 3D. Embodiments described herein include modifications of literature procedures[6,7]. In an exemplary embodiment, the resulting NCs are capped with organic ligands that facilitate dispersion in hydrophobic solvents. Transmission spectra of these dispersions reveal well-defined LSPR peaks whose position relates to the doping level, as shown in FIG. 3E. The frequency of the LSPR ($\omega_{LSP}$) is proportional to the bulk plasmon frequency ($\omega_P$), which varies as square root of the free carrier concentration (n)(1).

$$\omega_{LSP} \propto \omega_P = \sqrt{\frac{ne^2}{m^*\epsilon_0}} \tag{1}$$

The herein described embodiments' synthetic variation of the tin content manipulates n, which in turn adjusts $\omega_{LSP}$. The LSPR resonance frequency varies much less strongly with size (1), which is therefore available as a pseudo-independent variable in tuning the properties of our active coatings.

Figure 4A:
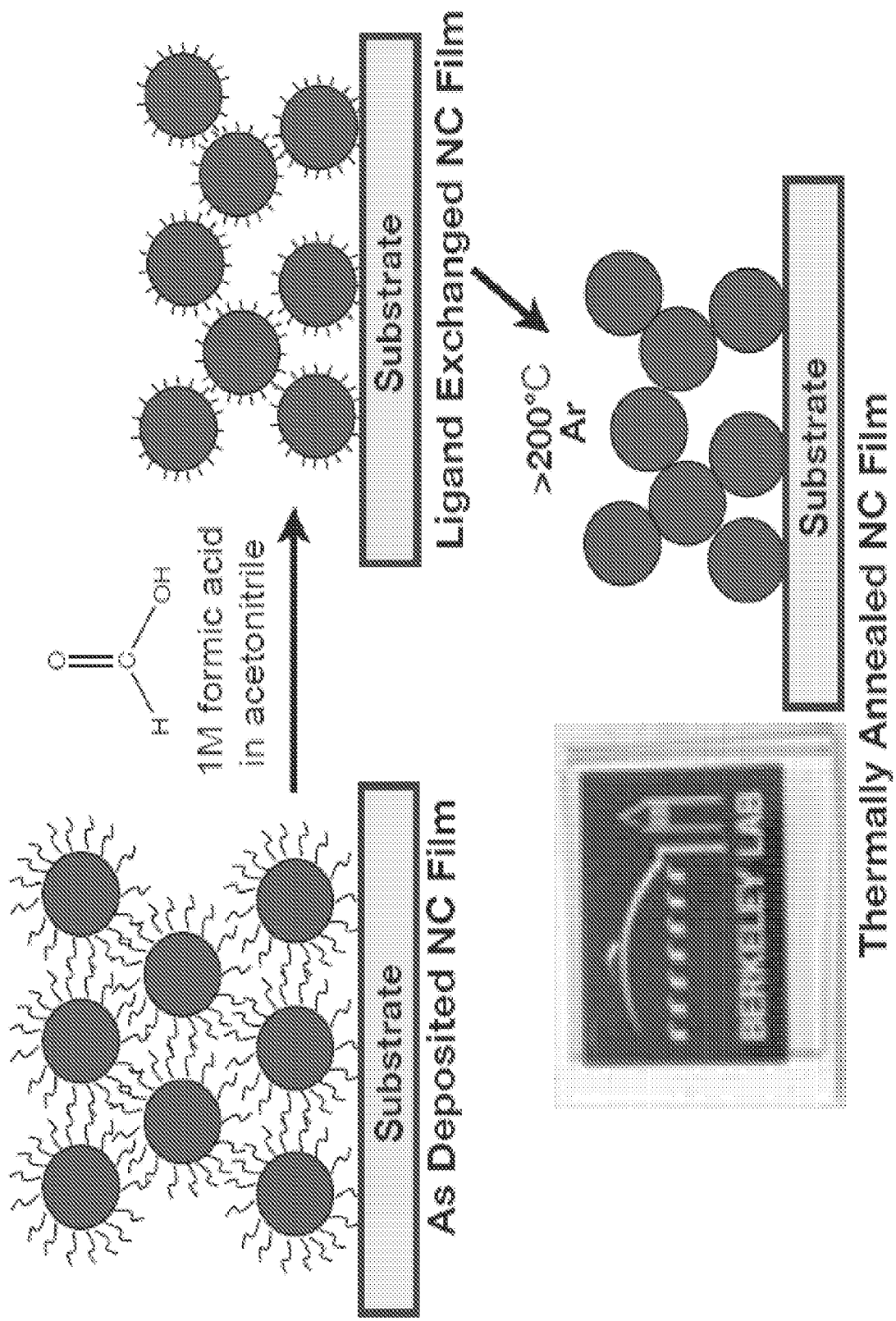
FIG. 4A shows an example of the processing of nanocrystals into an electrically conductive film.
Figure 5:
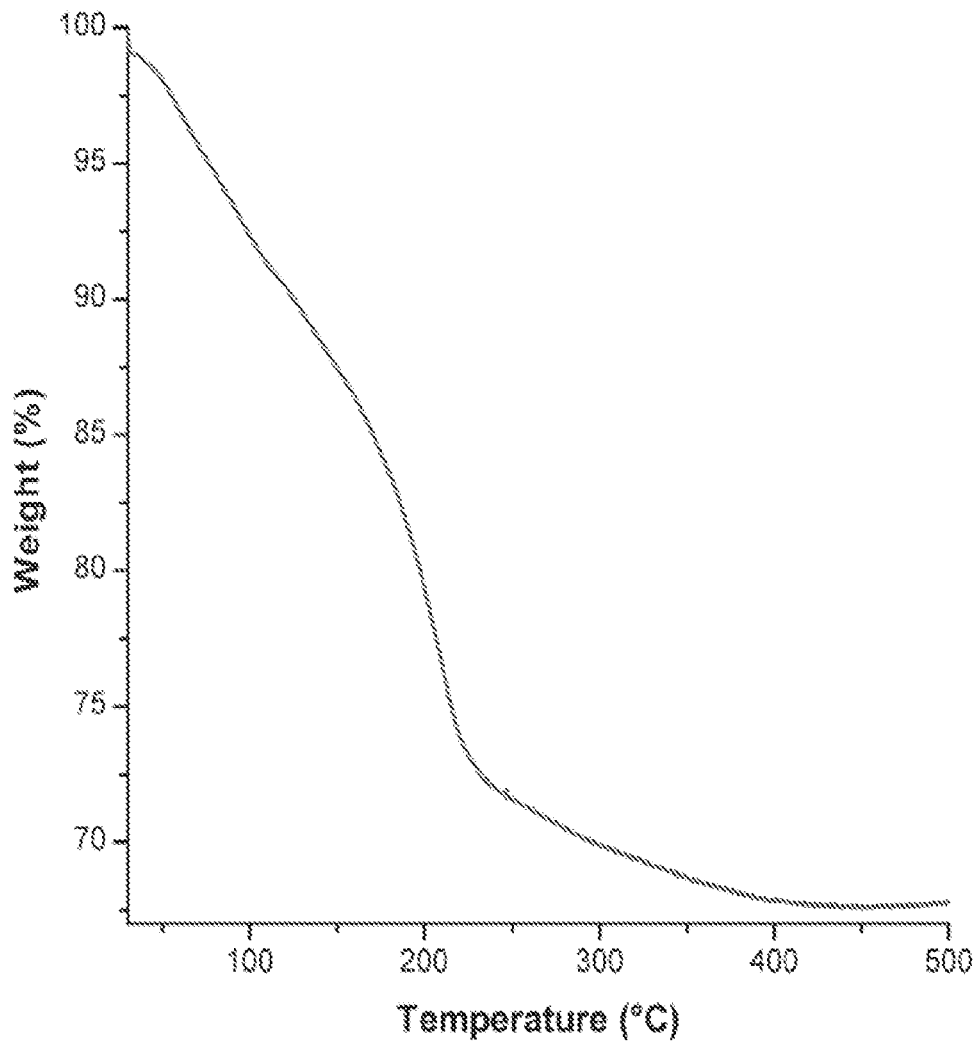
FIG. 5 shows an example of a graph of the desorption of formic acid from a nanocrystal film.
Figure 6:
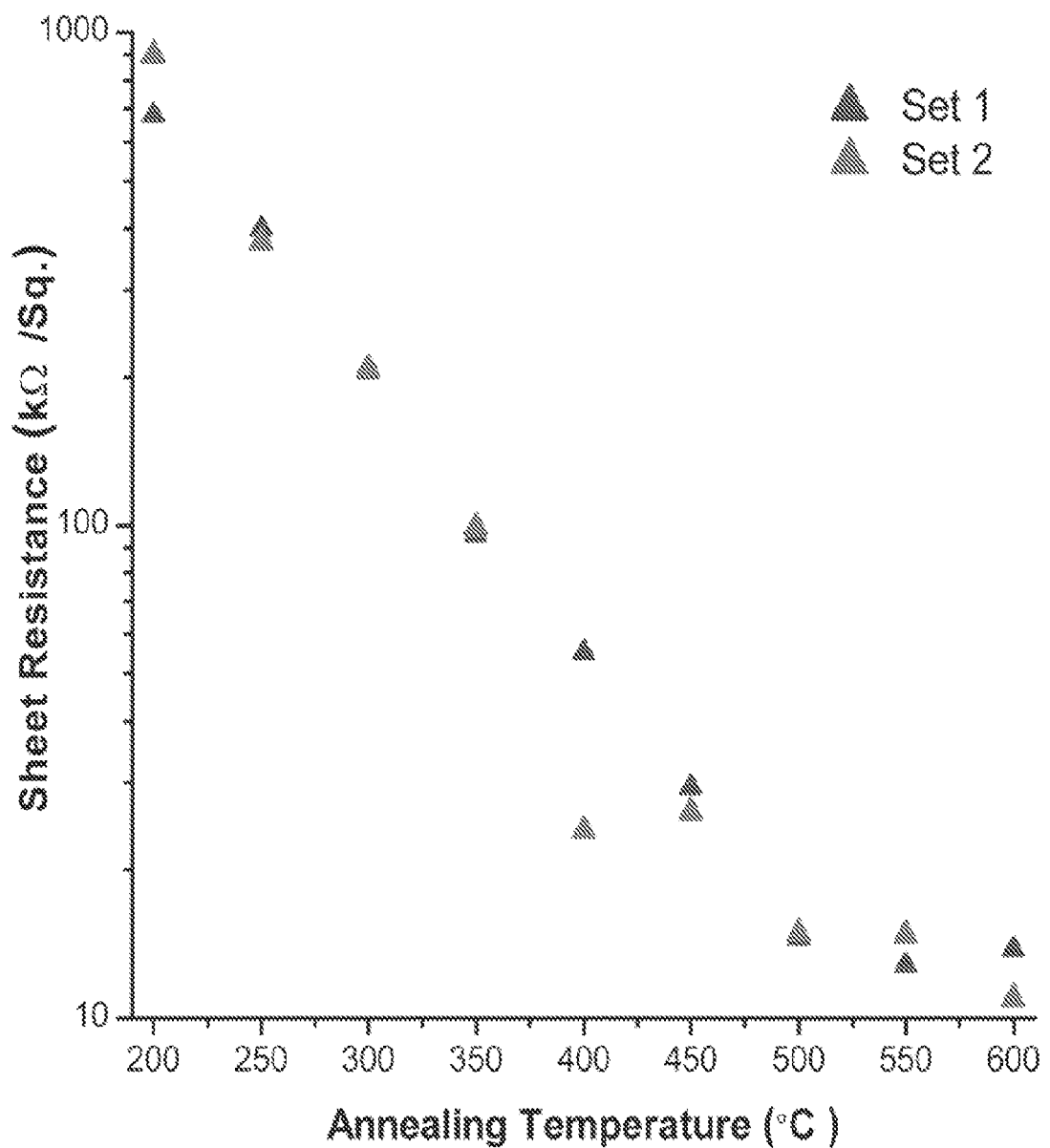
FIG. 6 shows an example of a graph of sheet resistance of a nanocrystal film versus annealing temperature of the film.

In order to enable dynamic modulation of the LSPR, the NCs were processed into electrically conducting films, approximately 150 nm thick, as shown in FIG. 4A. Deposition of uniform, non-scattering films by spin coating from a mixture of hexane and octane was facilitated by the hydrocarbon ligands which cap the surfaces of the NCs. However, these ligands form highly insulating barriers between adjacent NCs and had to be eliminated. Embodiments described herein include displacing the original, bulky oleic acid ligands with small molecules by submerging the NC film in a solution of formic acid, resulting in mass-action driven ligand exchange within the film[17]. Formic acid is volatile and can be desorbed by low temperature annealing in an inert environment, as shown in FIG. 5. The sheet resistance of the film drops with annealing temperature up to 500° C., but it is already sufficiently low following a 200° C. anneal to conduct in-plane over centimeter-scale sample dimensions, as shown in FIG. 6. Embodiments described herein include annealing the films at 250° C., which reproducibly gave well-conducting films with a low thermal budget.

Figure 4B:
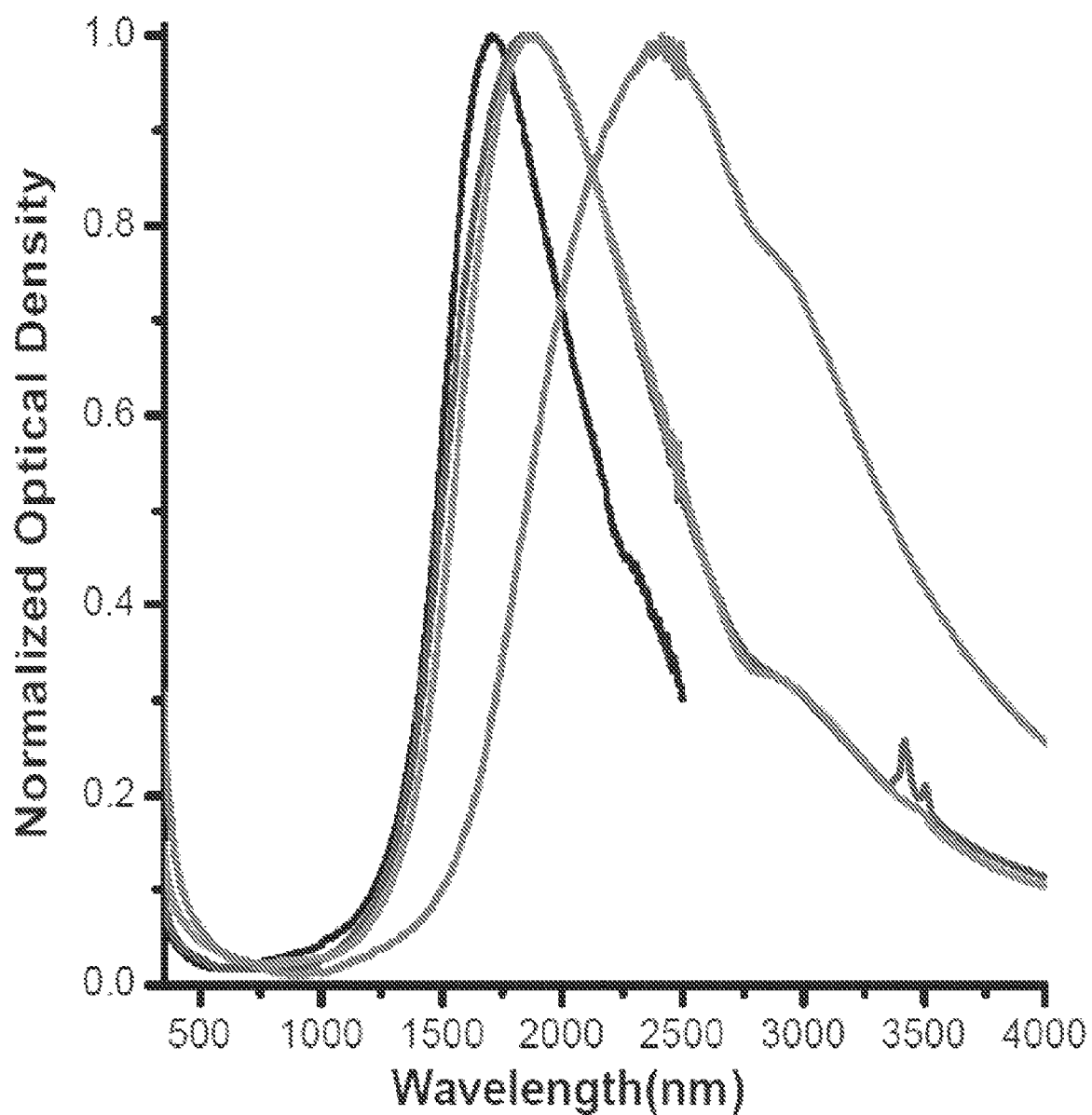
FIG. 4B shows examples of graphs of transmission spectra of different nanocrystal electrically conductive films.

At each stage of film deposition and processing, the absorption peak shifted to longer wavelength, as shown in FIG. 4B, raising questions about possible changes in the free carrier concentration and the structure of the NC films. First, it was verified that the crystallite size remained fixed; the x-ray diffraction pattern and peak widths remained unchanged following annealing. An extended Drude model was employed to fit the optical transmission spectra. The model considered possible changes in the carrier concentration, the dielectric environment, the volume fraction of the NCs, as well as variations in damping that might arise as the NC surfaces are chemically modified[18,19]. Excellent fits were achieved to the experimental data from which it was concluded that the shifts in the absorption peak can be primarily ascribed to an increasing ITO volume fraction from extremely low in the solvent dispersion, to 0.35 in the as-deposited film containing oleic acid ligands, and finally to 0.47 in the ligand exchanged and annealed film. The increasing ITO volume fraction both enhanced coupling between adjacent NCs, which were brought into more intimate contact with each processing step, and raised the average dielectric environment surrounding the NCs[20,21]. Very little change in the plasmon frequency was observed, and therefore in the free carrier concentration, during film processing.

Figure 7A:
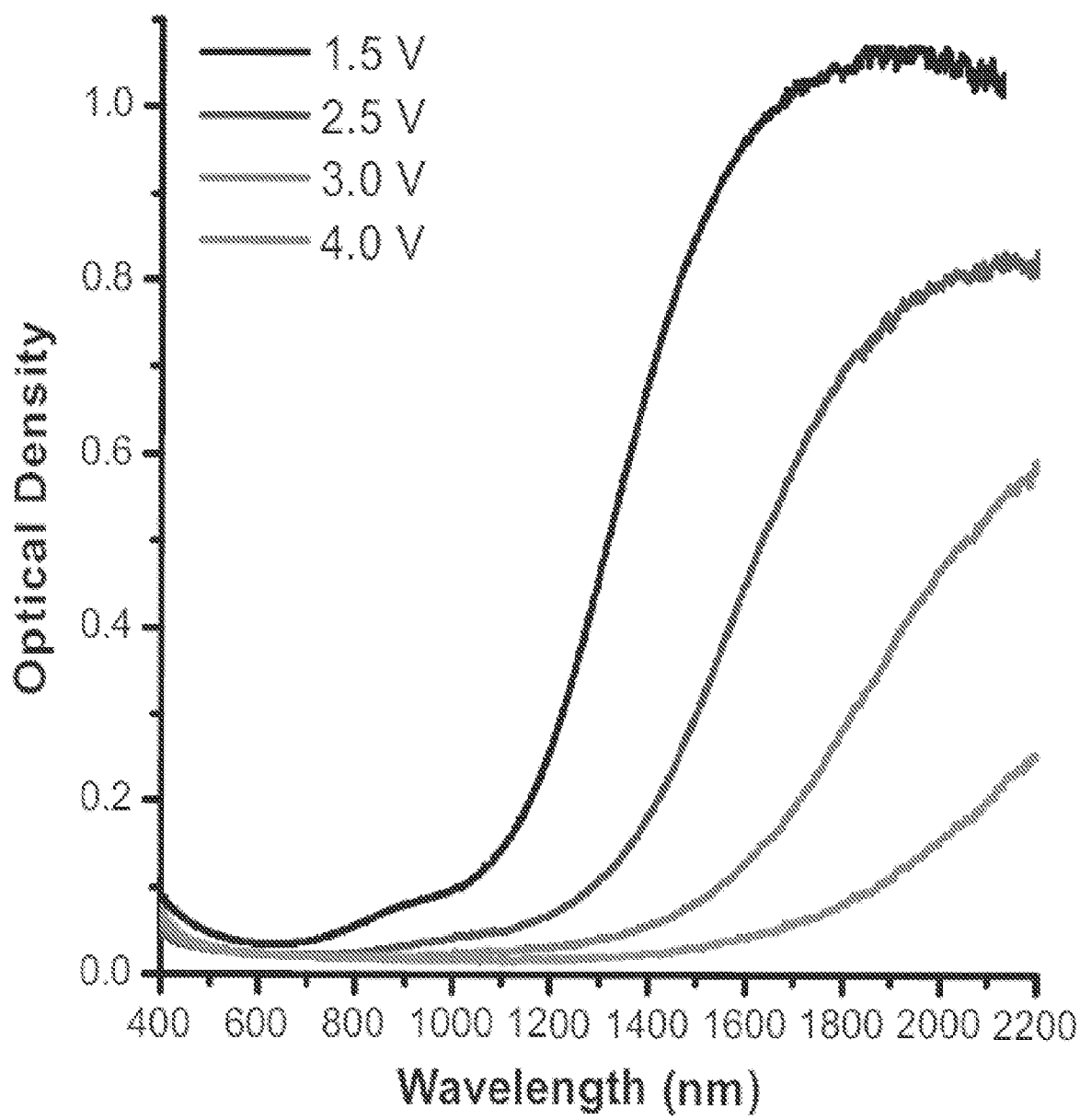

In order to actively modulate their surface plasmon resonance, the NC films were positioned as the working electrode in an electrochemical cell and in situ transmission spectra recorded as a function of the applied potential. Due to the onset of strong absorption bands of the electrolyte, the in situ measurements were limited to a spectral window of 400-2200 nm. The optical spectrum of the film at its open circuit voltage showed minimal change compared to its spectrum in an air environment, consistent with the change in dielectric environment and indicating that no chemical reactions occur at the NC surface. As a negative bias was applied, the SPR peak shifted to higher energy and became more intense, as shown in FIG. 7A. Both changes were consistent with the modulation of the free carrier concentration, n, which would shift the plasmon resonance frequency, as in equation (1), and increase the extinction at the LSPR peak proportionally[1].

This result stands in stark contrast to earlier reports of the spectroelectrochemical response of nanocrystalline Sb—SnO$_2$ films[22,23]. In that case, the applied potential induced negligible shift, only changing the intensity of the plasmon absorption feature. It was suggested that a high density of surface traps led to a strong depletion of free carriers near the surface and a variation in the thickness of this depletion region was proposed to account for the nearly constant $\omega_{LSP}$ even as electrons were injected or extracted. The strong shifting of the LSPR peak observed with the embodiments described herein suggests that the some embodiments are relatively free of such surface defect sites.

Figure 7B:
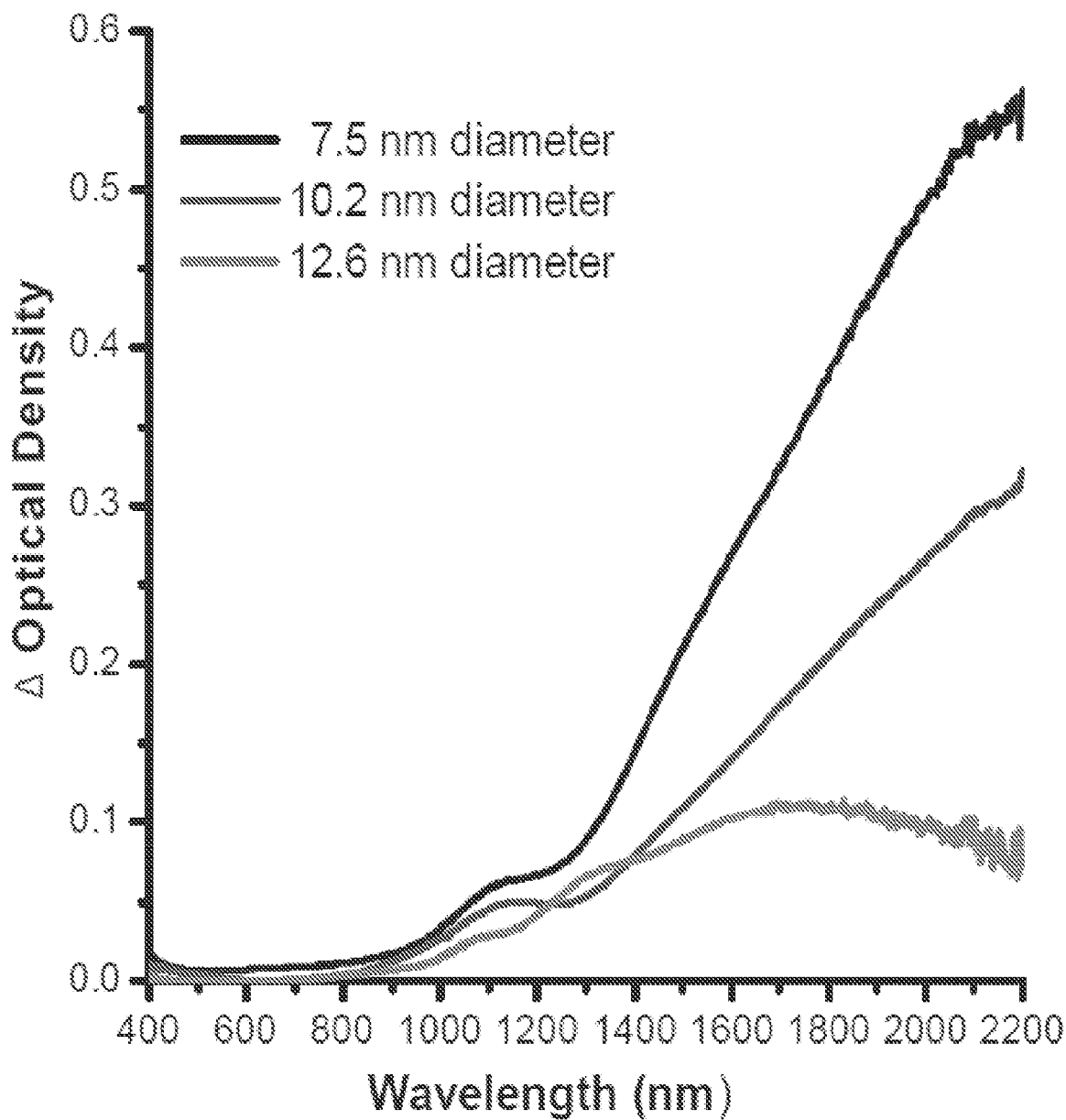

In fact, it is proposed that the modulation of the surface plasmon resonance in embodiments described herein is more analogous to that found in metallic nanostructures[14] and is related to that demonstrated recently at the planar interface of ITO with a dielectric layer[24]. In the latter case, the free carrier concentration in a thin (~5 nm) accumulation region was modulated by applying a potential between the ITO film and a counter electrode on the opposite side of the dielectric layer. Since plasmon resonance shifts to both shorter and longer wavelength than the initial state were observed, it is suggested that accumulation and depletion regions, respectively, are formed near the surface of the NCs. This hypothesis predicts greater modulation for smaller NCs, whose entire volume can lie within the strongly modulated accumulation/depletion region. Indeed, comparing NCs of similar chemical doping level, the magnitude of the change in extinction between the two extremes of applied bias tracks with NC diameter, as shown in FIG. 7B. Thus, for small, highly doped NCs, the embodiments described herein can strongly modulate the plasmon frequency, and the associated free carrier concentration, throughout the volume of each NC and of the overall film to account for the nearly constant $\omega_{LSP}$ even as electrons were injected or extracted.

Results

Figure 7C:
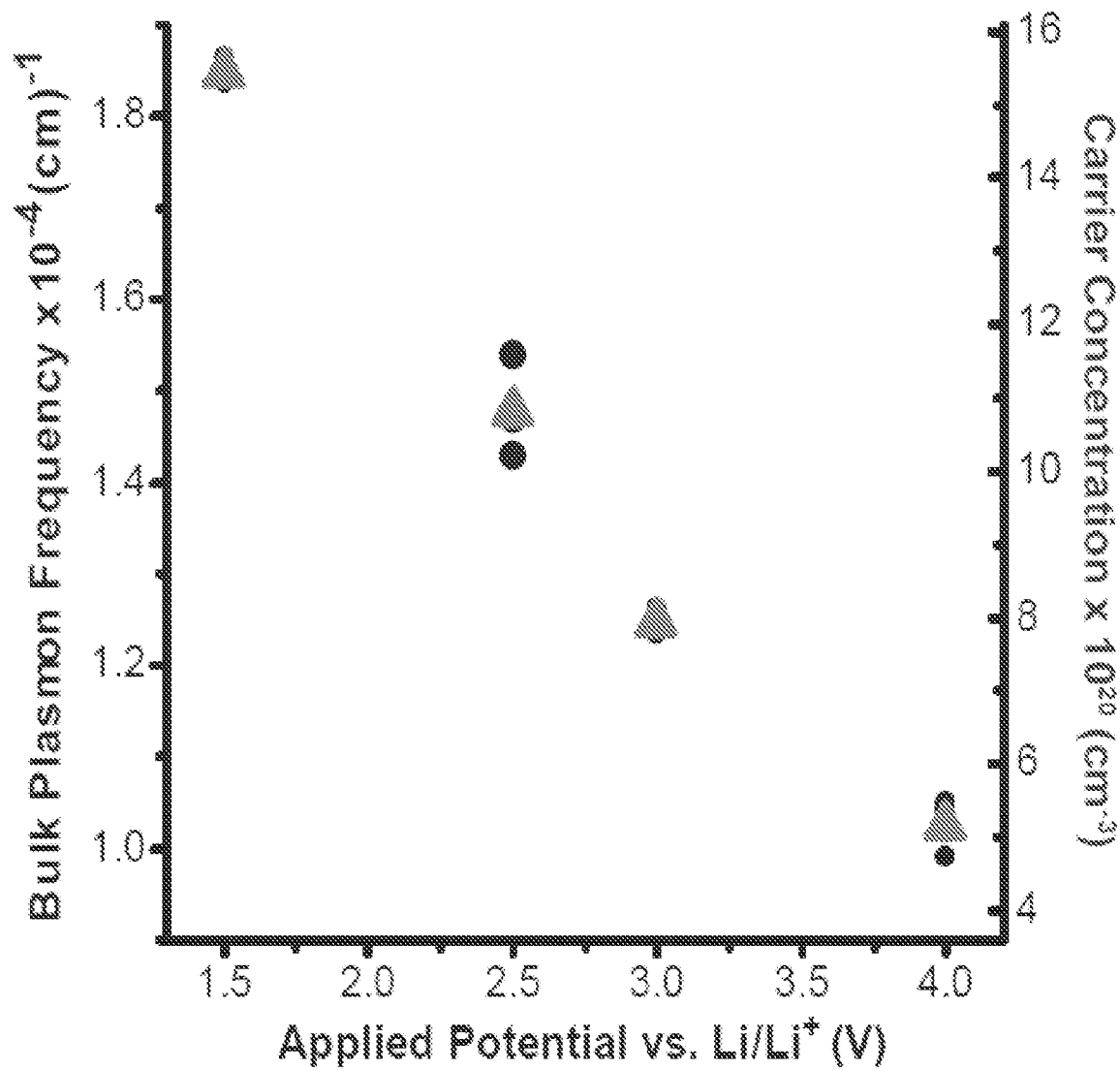
Figure 8:
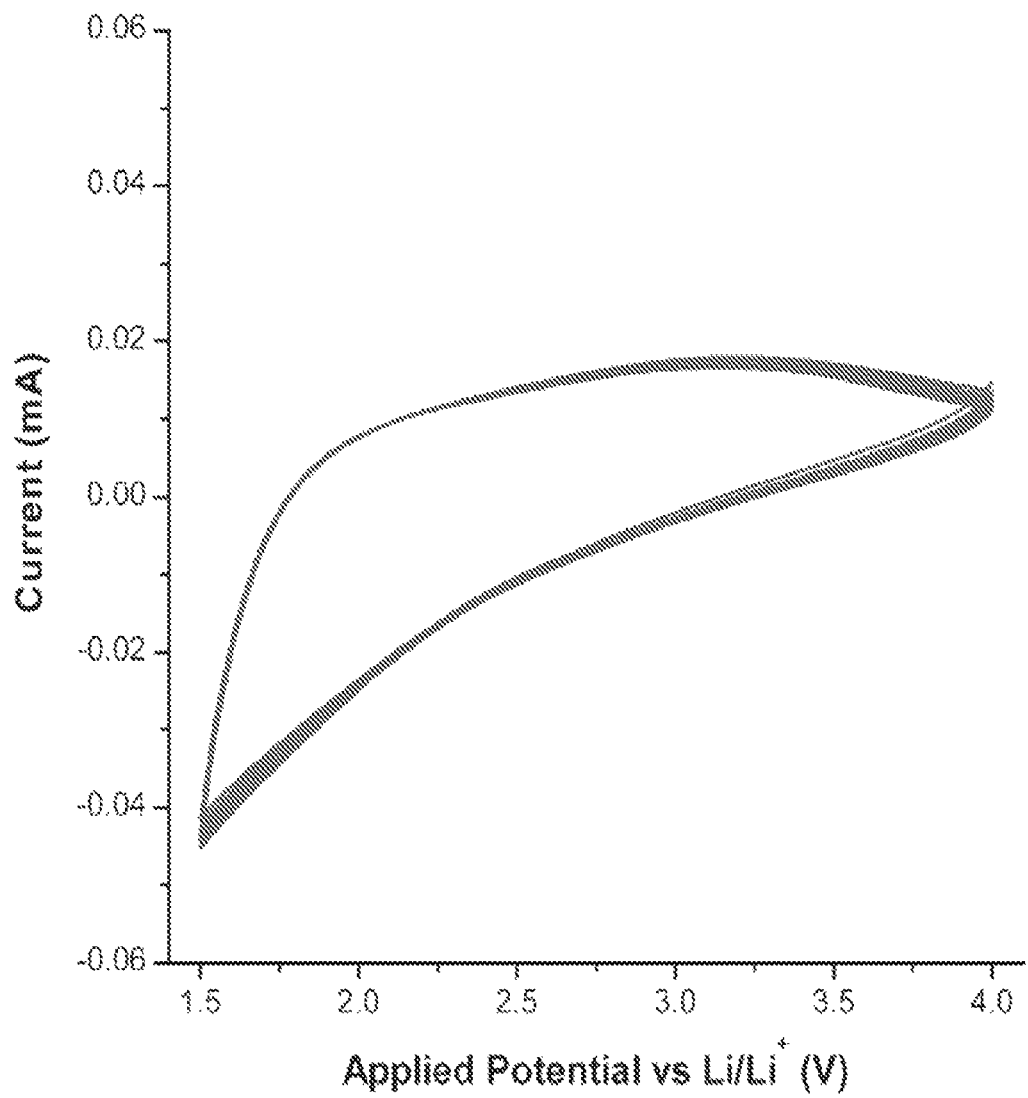

These dynamic changes were quantitatively evaluated by fitting the spectra of the electrochemically modulated NC film using the extended Drude model. Absolute transmittance of the entire electrochemical cell was used for the modeling in order to properly account for the interfaces. For the free parameters associated with the ITO nanocrystal film, confidence in the values was evaluated by starting with various initial conditions and keeping all parameters within physically reasonable bounds. It was found that $\omega_P$ converged reliably to near the same value regardless of the starting conditions, so that $\omega_P$ and n could be extracted as a function of the bias applied in the electrochemical cell, as shown in FIG. 7C and FIG. 8. The free carrier concentration changed by nearly a factor of three, resulting in almost a factor of two change in the plasmon frequency between the two extremes.

Such large changes in plasmon resonance could be applicable to micron-scale plasmonic devices, or might even be leveraged at the single-nanocrystal level[2,14]. Unlike the case of a planar ITO film, the transmission through the NC film changes dramatically since there is far greater surface area. It was noted that the contrast ratio for transmittance of 1.55 μm light, relevant to telecommunications, exceeds 12:1 (~11 dB) without any optimization. By adjusting the chemical doping level, modulation of any specific wavelength in the NIR could be maximized via the embodiments described herein.

Figure 9A:
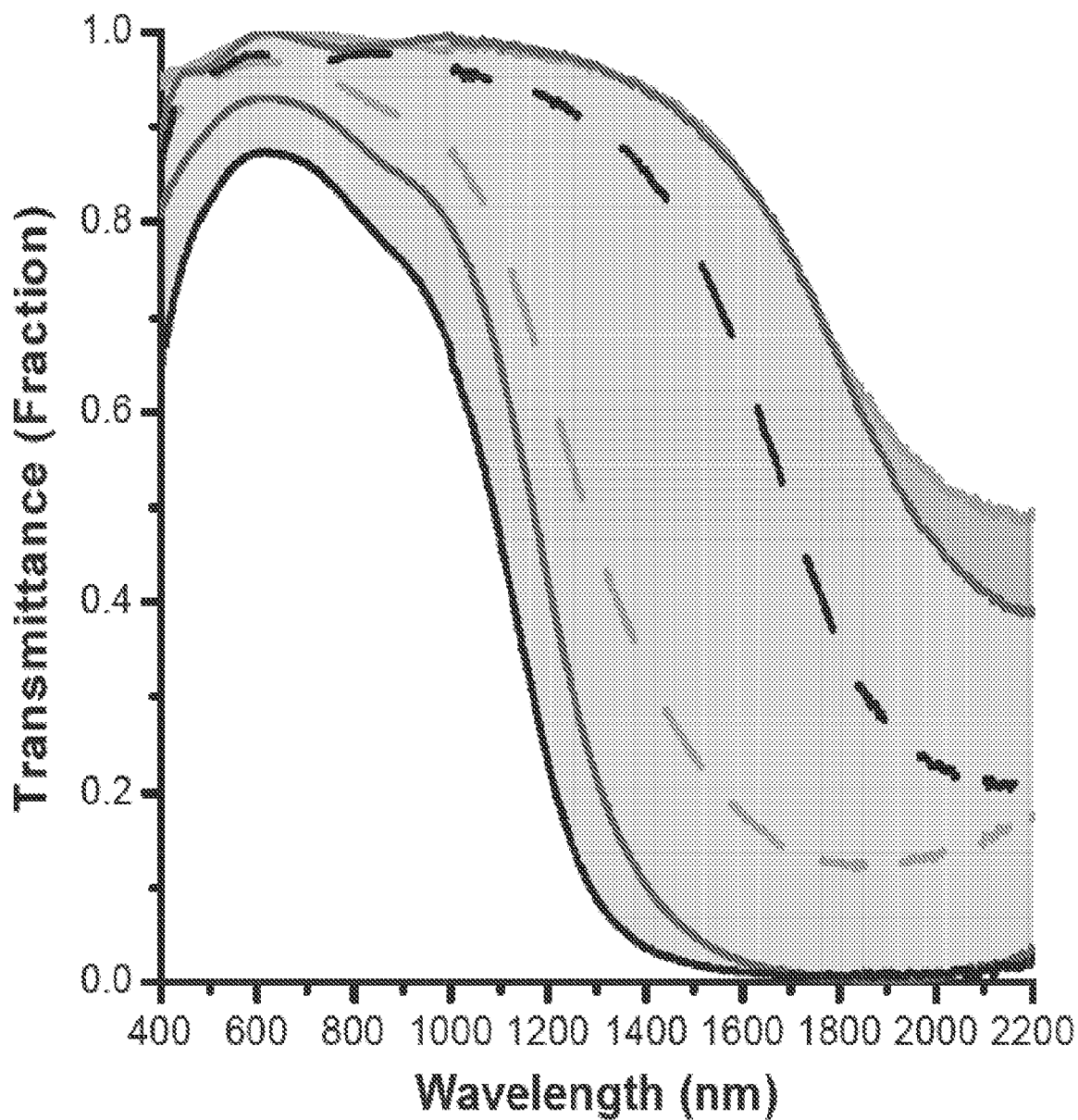

The potential performance of a dynamic, spectrally-selective window coating based on LSPR modulation was explored by measuring the dynamic transmittance of NC films, in accordance with the embodiments described herein, as a function of film thickness, as shown in FIG. 9A. In thicker films the surface plasmon absorption became saturated, providing a sharper edge between high and low transmission and minimizing the NIR transmittance at negative bias. However, the maximum NIR transmittance at positive bias and the visible transmittance, in general, were adversely affected. These trade-offs led to an optimal thickness at which the dynamic range of NIR transmittance is maximized, with minimal impact on visible transmittance.

Figure 9B:
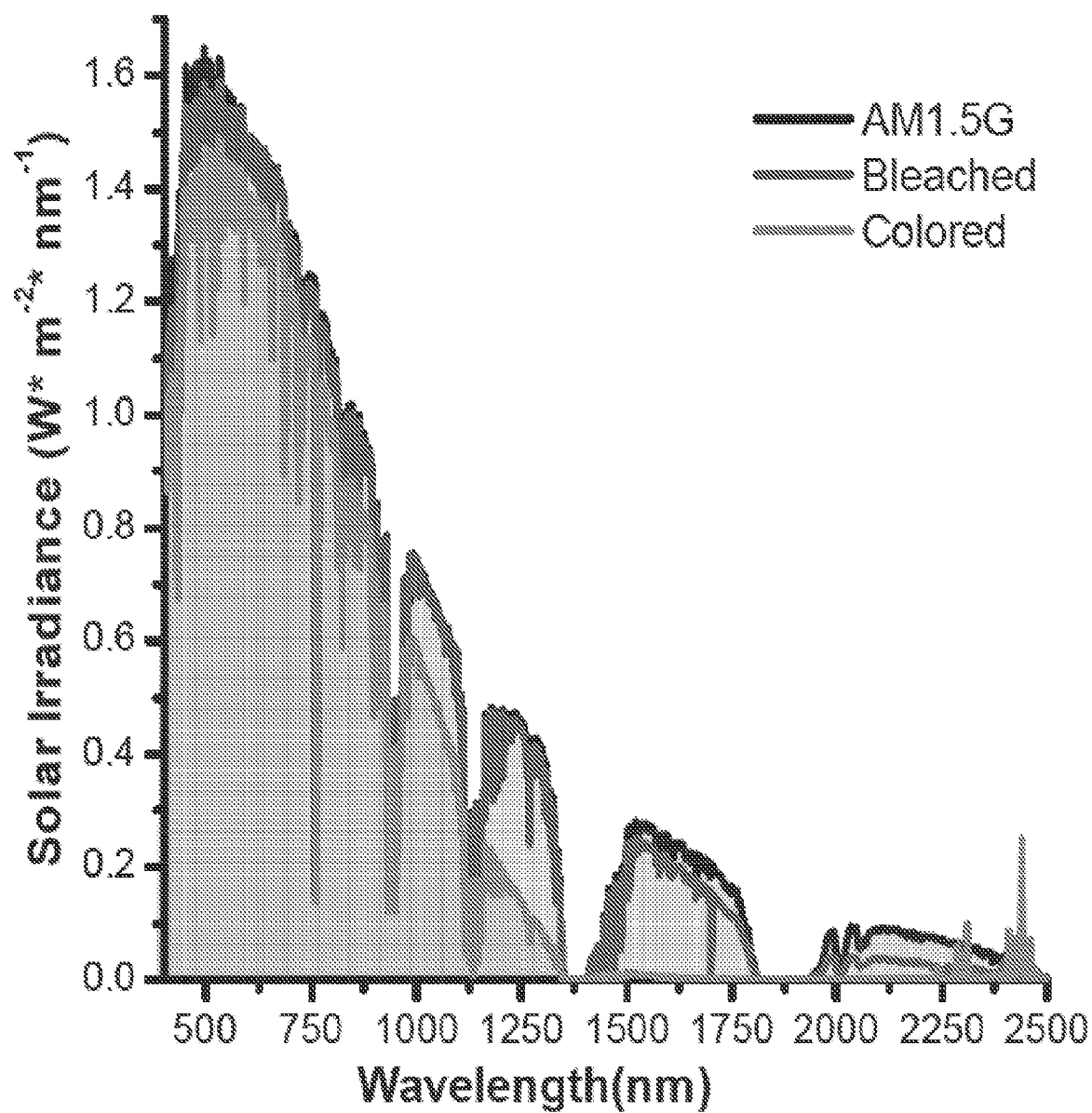
Figure 9C:
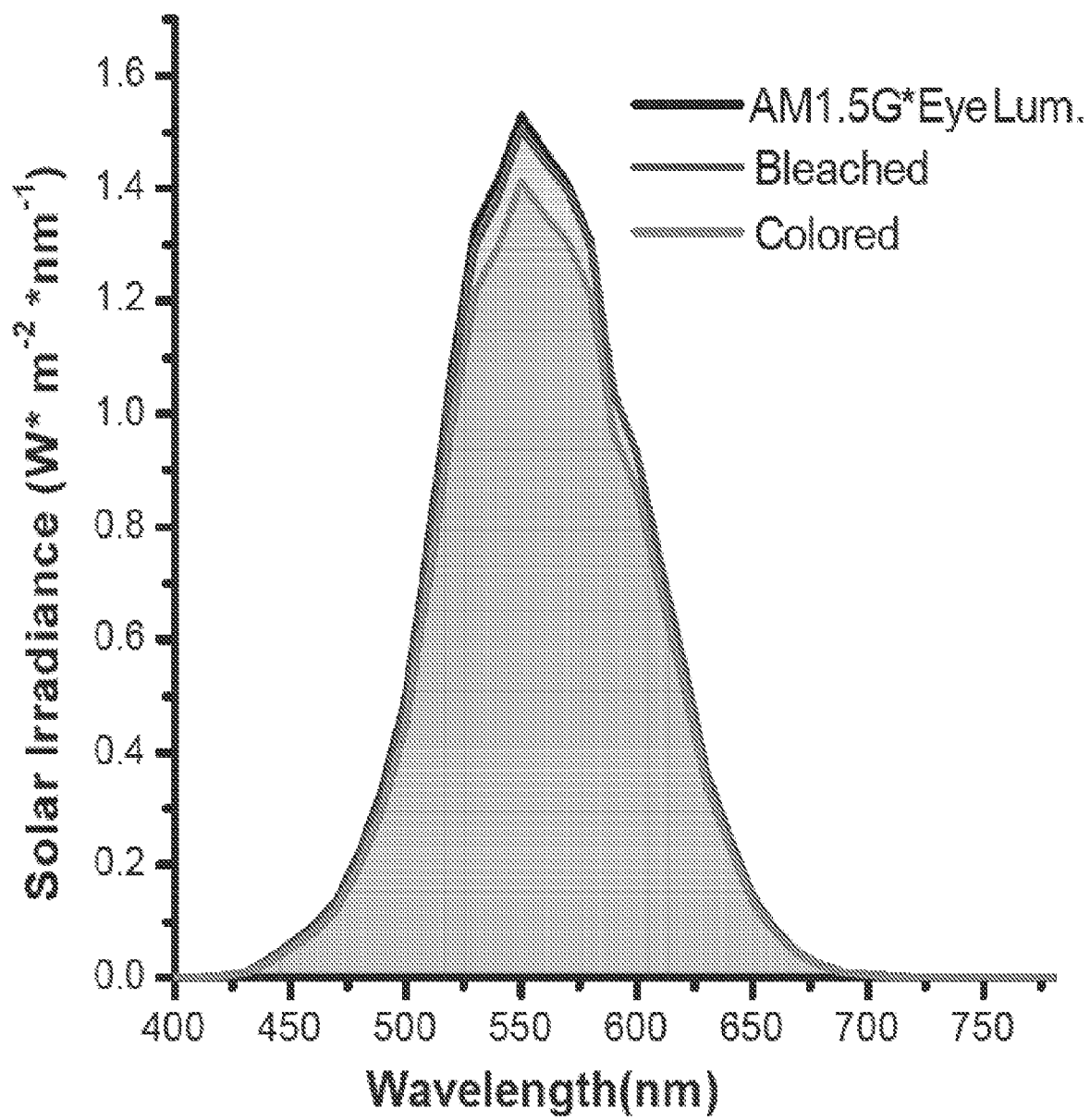

The implications of these dynamic optical properties for smart window performance could be evaluated by convoluting the transmittance spectra of the 310 nm thick NC film with the solar spectrum, as shown in FIG. 9B. The shaded regions show the portion of the solar spectrum transmitted when the film is in the "bleached" state (positive bias) and "colored" state (negative bias). It is apparent that NIR light is strongly modulated while visible light is largely transmitted in both states. Integrating these curves, a 21% difference in transmittance overall and 35% difference in transmittance of the NIR portion of the solar spectrum between the two states were found. This already represents a substantial modulation of solar heating for a window, with further gains potentially available by additional optimization of nanocrystal size, chemical doping level, coupling, and film thickness. Meanwhile, there is only 6% modulation of the solar insolation visible to the human eye, as shown in FIG. 9C; even in the colored state, over 92% of this light remains available to off-set the need for electric lighting.

Preliminary durability testing of the embodiments described herein showed virtually no change in their electrochemical properties over multiple charge-discharge cycles, as shown in FIG. 10, and CdSe NC films have been cycled at least 10,000 times without degradation[12]. The stability of the embodiments described herein is consistent with the mechanism proposed above in which an accumulation/depletion layer is reversibly switched near the NC surface. Unlike a conventional electrochromic coating[26] or the plasmonic Cu$_2$S and Cu$_2$Se NCs recently reported[9,10], this operating principle does not involve cation migration through the active material. In other words, the switching is capacitive and the embodiments described herein operate like the electrode of a supercapacitor.

Figure 11:
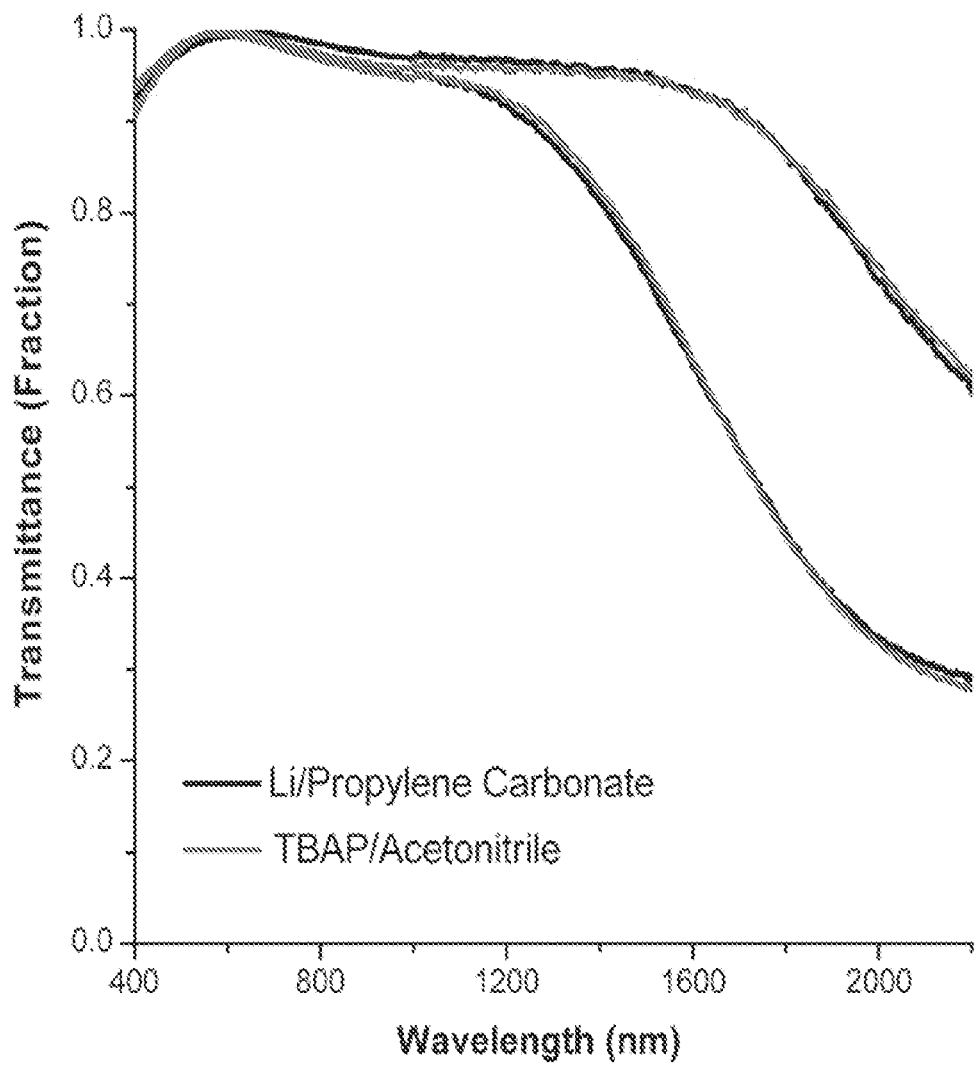
Figure 12:
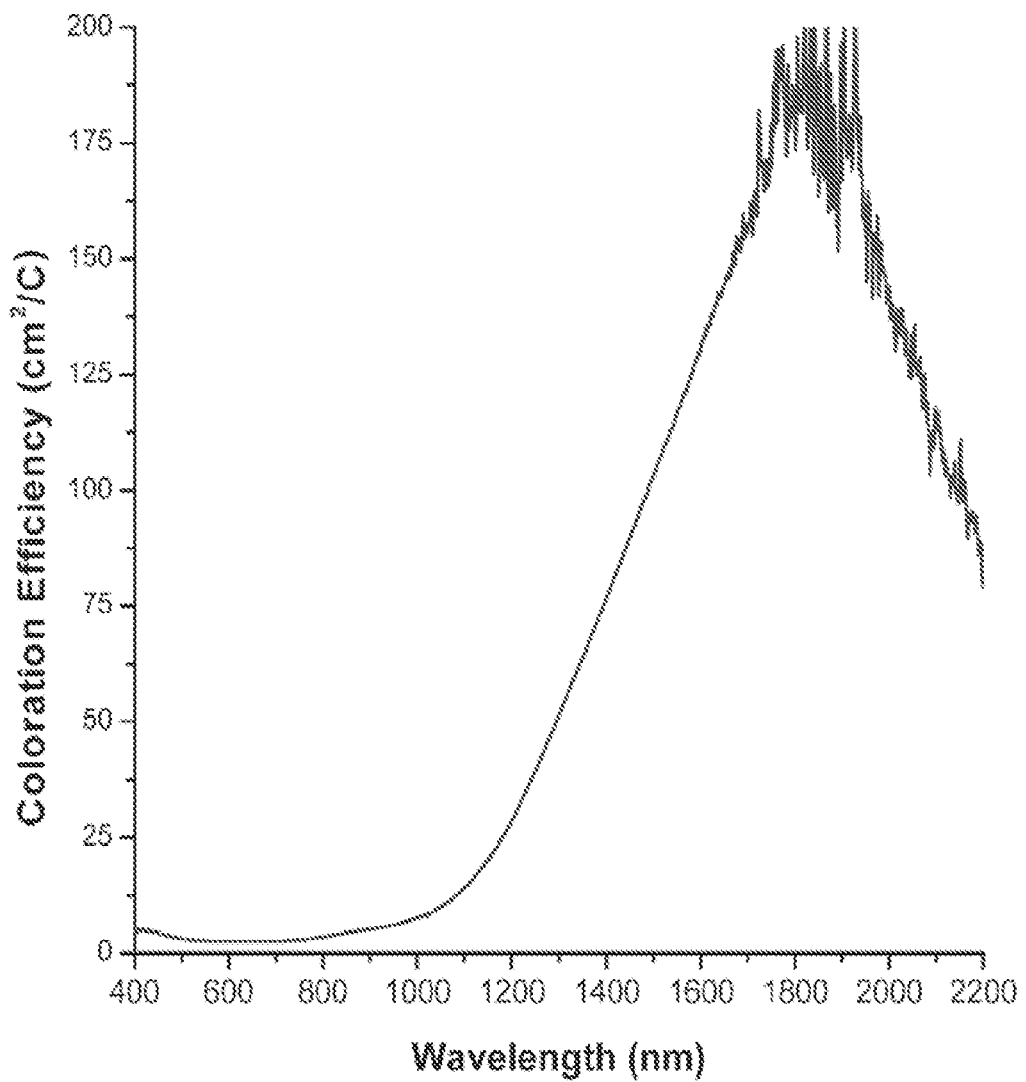

The hypothesis of capacitive switching was tested by comparing the spectroelectrochemical response of a NC film in Li$^+$ containing electrolyte to its behavior in a tetrabutylammonium (TBA) electrolyte. Unlike Li$^+$, TBA$^+$ is physically too large to intercalate, leaving only capacitive contributions[23]. The charging profile, recorded by cyclic voltammetry is similar for the two electrolytes, and the total charge injected and extracted is nearly identical, as shown in FIG. 11. Even more telling, the NIR optical responses were indistinguishable, as shown in FIG. 12. Clearly, intercalation was not required to achieve the extreme modulation of plasmon resonance that was observed. A principle degradation pathway for battery and electrochromic electrode materials, namely strain from repeated intercalation and deintercalation[26], was thus circumvented by the capacitive operating mechanism of the embodiments described herein. The coloration efficiency is also improved by several fold over conventional electrochromic films, as shown in FIG. 12.

The efficacy of compensating injected carriers capacitively, without intercalation, is not limited to the choice of ITO as an electrode material; it is rather a direct consequence of nanostructuring on the single-digit nanometer scale. Any material which undergoes a change in optical properties upon charging and discharging, including other plasmonic NCs, but also conventional electrochromic materials like $WO_3$, could, in principle, be operated in this manner[27]. Hence, the embodiments described herein suggest a new paradigm for the design of nanocrystal-based electrochromic electrodes that are robust to cycling, greatly expanding options for material selection to achieve targeted optical response characteristics for smart windows and other applications of optical modulation.

Uses

The electrochemical modulation of transmittance through the embodiments described herein is of particular interest for dynamic "smart window" applications. In this case, the embodiments described herein could be effectively part of a macroplasmonic device, operating on nanoplasmonic principles. The heat load derived from solar infrared radiation could be dynamically modulated in response to the changing outdoor environment by the embodiments described herein, while visible light transmittance could be maintained for daylighting use[25] by the embodiments described herein.

General

The embodiments described herein demonstrate that the surface plasmon resonance of ITO NC films can be dynamically tuned through fully reversible electrochemical doping, hence realizing the promise of electrical manipulation of semiconductor LSPR features. However, the LSPR modulation of the embodiments described herein is a collective response of the free electrons, more analogous to the electrochemical response of Au or Ag LSPR[13,14].

LSPR of the embodiments described herein can shift dynamically across a range covering much of the near infrared (NIR) spectrum (including telecommunications wavelengths), opening the door to potential applications including controlling optical coupling into or out of nanoplasmonic devices or tuning plasmonic enhancement of spectroscopic signatures[15]. The embodiments described herein could dynamically modulate transmittance of solar infrared radiation. Considering their excellent visible transparency, such modulation offers a unique opportunity for a dynamic coating on advanced, energy-saving "smart windows."

Additional Material

Materials

Indium acetylacetonate (In(acac)3, 99.99%), tin bis(acetylacetonate) dichloride (Sn(acac)2Cl2, 98%), tin acetate (Sn(Ac)4 99.99%), myristic acid (MA, >98%), 1-octadecene (ODE, 90%), and oleic acid (OLAC, 90%) were purchased from Aldrich and used without further purification. Oleylamine (OLAM, 90%) was obtained from Acros.

Methods

ITO Nanocrystal Synthesis

The synthesis of ITO nanocrystals (NCs) is based on slight modifications of literature protocols(6,7) and is carried out under an inert atmosphere using standard Schlenk-line techniques. In detail:

a) 4 nm diameter ITO NCs with 16.8% of Sn: In(acac)3 (1 mmol), Sn(acac)4 (0.2 mmol), and MA (3 mmol) were mixed with 20 mL of ODE in a three-neck flask and degassed under vacuum at 110° C. for 2 h. Afterwards, the temperature was increased to 295° C. and 1 mL of a previously degassed 3 M solution of OLAM in ODE was rapidly injected. The solution temperature dropped to 280° C. and was maintained for 1 h. The solution became yellow in color almost instantaneously, later turning to orange and finally dark green within 10 minutes of the injection. The temperature was then further reduced to 240° C. for an additional 1 h. The NCs were collected by adding 10 mL of chloroform to the final reaction mixture and precipitating with ethanol. Further precipitation and washing were performed with hexane/ethanol. Finally, the NCs were dispersed in a 1:1 mixture of octane:hexane.

b) 7 nm ITO NCs with 4.4% of Sn: A solution containing In(acac)3 (0.5 mmol) and Sn(acac)2Cl2 (0.027 mmol) in 7 g of OLAM was mixed in a 50 ml three-necked flask and magnetically stirred under nitrogen at 250° C. for 5 h. The solution became clear as the precursor salts dissolved, and progressed to a dark yellow color, followed by a dark blue-green color upon reaching 250° C. The final product was collected after repeated steps of precipitation with ethanol, centrifugation, and redispersion in hexane and 20 μL OLAM and 40 μL OLAC were added to further stabilize the NC dispersion. After three cycles of redispersion in hexane and reprecipitation with ethanol, ITO NCs were redispersed in a 1:1 mixture of octane:hexane.

c) 10 nm ITO NCs with 4.4% of Sn: NCs were obtained through the same procedure described for the 7 nm NCs by using 2 mmol of In(acac)3 and 0.11 mmol of Sn(acac)2Cl2.

d) 12 nm ITO NCs with 4.4% of Sn: NCs were obtained through the same procedure described for the 7 nm NCs by using a 25 mL flask and reducing the OLAM to 2.3 g.

e) 12 nm ITO NCs with 9.4% of Sn: NCs were obtained through the same procedure described for the 7 nm NCs by increasing the Sn(acac)2Cl2 to 0.054 mmol.

Elemental Analysis

Elemental analysis was performed by induced coupled plasma atomic emission spectroscopy (ICP-AES) with a Varian 720/730 Series spectrometer. The ITO samples were digested in concentrated HCl. The relative error on the extracted Sn content was within 3% of the reported percentage, as evaluated on the basis of 9 replicates per each measurement.

Morphological Analysis

Low- and high-resolution TEM were carried out on a JEOL 2100 microscope, at an accelerating voltage of 200 kV. Samples for TEM analysis were prepared by drying a drop of hexane solution containing the NCs on the surface of an ultra-thin carbon-coated copper grid.

Film Preparation

A spincasting technique was used to generate thin films of ITO nanocrystals. Glass substrates were cleaned via sonication in a three step process: 15 min de-ionized water with 2% Helmenex solution, 15 min acetone, 15 min isopropanol. Three rinses were performed between each sonication step. Using a one to one octane/hexane solution of ITO nanocrystals (~67 mg/ml), 30 ul where dispensed on a 2.5 cm×2.5 cm glass substrate. Spinning recipe consist of an initial 1000 RPM spin for 30 seconds followed by a 4000 RPM spin for 20 seconds. In situ ligand exchange was performed on the nanocrystal films by immersing them in a 1 M formic acid/acetonitrile solution for 45 min. Samples were rinsed with acetonitrile and dried with a nitrogen gun prior to thermal treatment. All samples were heated in an argon environment at 250° C. for 1 hr. Entire process was repeated for additional layers to increase film thickness. Film edges were removed from samples to eliminate regions of poor uniformity created from spincoating. Gold contacts, 110 nm thick with a 5 nm chromium adhesion layer, were thermally evaporated at one edge of the sample.

Film Characterization

Film thickness was measured between each post processing step using a Vecco Dektak 150+ Profiler and confirmed with 90 degree cross section images using a Zeiss Gemini Ultra-55 Analytical Scanning Electron Microscope. Film morphology was checked between post processing step using a Bruker D8-Discover X-ray diffractometer equipped with a GADDS area detector and operated at 40 kV and 20 mA at the wavelength of Cu K$\alpha$, 1.54 Å.

Electrochemical Measurements

Prepared films where immersed in an anhydrous 0.1 M lithium perchlorate/propylene carbonate electrolyte solution for electrochemical measurements. Separate lithium foils were used for both counter and reference electrode. The films were driven at a potential range of 1.5V to 4V versus the reference electrode. In situ optical spectra were taken of the films at various potentials. These were collected after allowing for stabilization of the optical response, which took several minutes. However, this is not an inherent limit to the switching speed and is likely limited by the low in-plane conductivity. Nanocrystals supported by an underlying (sputtered) ITO film switched much more rapidly, but this configuration was avoided to simplify the interpretation of the transmission spectra. Pathlength of the electrolyte was ~2 mm during measurements. Charge measurements between the potential limits were performed using a chronopotentiometry technique with a 10 µA sourced current. Five cycles were performed in each measurement and a final value was averaged out from the set. Film cycling was performed using a cyclic voltammetry technique. Films were cycled an average often times between the potential limits at a 1 mV/s scan rate. All electrochemical measurements were repeated with an anhydrous 0.1 M tetrabutylammonium perchlorate(TBAP)/acetonitrile electrolyte. In this set up, a platinum wire was used as a counter electrode. A Ag/Ag+ reference electrode consisting of a silver wire immersed in a 0.01 M AgNO3/0.1 M TBAP/acetonitrile solution was used as a reference electrode. The films were driven between a potential range of −1.55V and 0.95V versus the reference electrode in order to match the conditions set by the lithium based electrolyte. Coloration efficiency was calculated by taking the ratio of the change in optical density between the positive and negative bias with its associated charge per unit area. All electrochemical measurements were performed in an argon glove box with a Bio-logic VSP potentiostat and a ASD Quality Spec Pro VIS/NIR spectrometer.

Drude Modeling

Specular transmittance of the ITO nanocrystal solutions, thin films, and electrochemical half-cell devices was simulated using the Scout software package (www.wtheiss.com). In each case, the absolute transmittance was modeled since the geometry of the experiment must be accurately accounted for. Before fitting the optical constants to the ITO nanocrystals, the transmittance of the substrate, cuvette, TCE, and/or electrolyte was modeled using a large number of free parameters. After a good fit to the background transmittance was obtained, these free parameters were fixed before fitting the ITO transmittance spectra.

For each geometry, the Maxwell-Garnett (MG) effective medium approximation was used to model the ITO nanocrystal layers. Typically the Bruggeman effective medium approximation is used for conductive nanocrystal films when the volume fractions are above about 0.3(18,19). However, it was found that this model did not provide as good of a fit for the thin films in this study, which had volume fractions of 0.4 and higher. This was surprising since Bruggeman's model accounts for electronic coupling between particles and the ITO films were all laterally conductive when tested with 4 point probe measurements.

For the 350-2500 nm spectral range, four components to the electric susceptibility were needed to describe the measured data. A constant dielectric background was the first component. Bandgap absorption was accounted for using the O'Leary-Johnson-Lim model(28), which has been applied to ITO previously(29). However, this model assumes absorption into unfilled parabolic bands, which is certainly not the case for highly doped ITO. As such, this model was chosen to qualitatively account for the bandgap and little trust was put into the extracted bandgap parameters. The third component to the susceptibility was a harmonic oscillator which describes UV absorption from the valence band to the upper half of the conduction band(29).

The fourth and final component was the free carrier absorption described by the extended Drude theory. Ionized impurity scattering is known to play an important role in the electronic transport in highly doped semiconductors. Such scattering is accounted for in the extended Drude theory by taking into account the frequency dependence of the damping constant. A commonly used empirical model was chosen which has proven useful for ITO(19,29). It gives very similar results as other analytical models(18,30) which account for the $\omega 3/2$ dependence(3) of the damping parameter.

By starting with a large number of very different initial guesses, a high level of confidence was obtained for the fitted plasma frequency since it converged to the same value in every case. This was true for the all the geometries studied here: thin films, solutions, and electrochemical half cell devices. Typically, film thickness extracted by the model was also reliable and agreed well with profilometer measurements. Finally, the near-particle dielectric function was found to vary systematically with applied potential.

This is consistent with the hypothesis of local reorganization of the electrolyte in response to the injected and extracted electronic charge. A detailed account of this dielectric function modeling will be published.

REFERENCES

1. Link, S. & El-Sayed, M. A. Spectral properties and relaxation dynamics of surface plasmon electronic oscillations in gold and silver nanodots and nanorods. *J. Phys. Chem. B.* 1999, 103, 8410-8426.
2. Liu, N., Tang, M. L., Hentschel, M., Giessen, H. & Alivisatos, A. P. Nanoantenna-enhanced gas sensing in a single tailored nanofocus. *Nature Mater.* 2011, doi:10.1038/nmat3029.
3. Larsson, E. M., Langhammer, C., Zoric, 1. & Kasemo, B. Nanoplasmonic probes of catalytic reactions. *Science* 2009, 326, 1091-1094.
4. Elghanian, R., Storhoff, J. J., Mucic. R. C., Letsinger, R. L. & Mirkin, C. A. Selective colorimetric detection of polynucleotides based on the distance-dependent optical properties of gold nanoparticles. *Science* 1997, 277, 1078-1081.
5. Atwater, H. A. & Polman, A. Plasmonics for improved photovoltaic devices. *Nature Mater.* 2010, 9, 205-213.
6. Giltsrap, R. A., Capozzi, C. J., Carson, C. G., Gerhardt, R. A. & Summers, C. J. Synthesis of a nonagglomerated indium tin oxide nanoparticle dispersion. *Adv. Mater.* 2008, 20, 4163-4166.
7. Choi, S., Nam, K. M., Park, B. K., Seo, W. S. & Park, J. T. Preparation and optical properties of colloidal monodisperse and highly crystalline ITO nanoparticles. *Chem. Mater.* 2008, 20, 2609-2611.
8. Kanehara, M., Koike, H., Yoshinaga, T. & Teranishi, T. Indium tin oxide nanoparticles with compositionally tunable surface plasmon resonance frequencies in the near IR region. *J. Am. Chem. Soc.* 2009, 131, 17736-17737.
9. Luther, M. J., Jain, P. K., Ewers, T. & Alivisatos. A. P. Localized surface plasmon resonance arising from free carriers in doped quantum dots. *Nature Mater.* 2011, 10, 361-366.
10. Dorfs, D. et al. Reversible Tunability of the Near-Infrared Valence Band Plasmon Resonance in $Cu_{2-x}Se$ Nanocrystals. *J. Am. Chem. Soc.* 2011, doi: 10.1021/ja2016284.
11. Wang, C., Shim, M. & Guyot-Sionnest, P. Electrochromic nanocrystal quantum dots. *Science* 2001, 291, 2390-2392.
12. Guyot-Sionnest, P. & Wang, C. Fast voltammetric and electrochromic response of semiconductor nanocrystal thin films. *J. Phys. Chem. B* 2003, 107, 7355-7359.
13. Ung, T., Giersig, M., Dunstan, D. & Mulvaney, P. Spectroelectrochemistry of Colloidal Silver. *Langmuir,* 1997, 13, 1773-1782.
14. Novo, C., Funston, A. M., Gooding, A. K. & Mulvaney, P. Electrochemical Charging of Single Nanorods. *J. Am. Chem. Soc.* 2009, 131, 14664-14666.
15. Boltasseva, A. & Atwater, H. A. Low-Loss Plasmonic Metamaterials. *Science* 2011, 331, 290.
16. Yamada, N. et al. Donor compensation and carrier-transport mechanism in tin doped $In_2O_3$ films studied by means of conversion electron$^{119}$Sn Mossbauer spectroscopy and hall effect measurement. *Jpn. J. Appl. Phys.* 2000, 39, 4158-4163.
17. Zarghami, M. H. et al. P-Type PbSe and PbS quantum dot solids prepared with short chain acids and diacids. *ACS Nano* 2010, 4, 2475-2585.
18. Ederth, J., Hleszler, P., Hlultaker, A., Niklasson, G. A. & Granqvist, C. G. Indium tin oxide films made from nanoparticles: Models for the optical and electrical properties. *Thin Solid Films* 2003, 445, 199-206.
19. Solieman, A. & Aegerter, M. A. Modeling of optical and electrical properties of $In_2O_3$:Sn coatings made by various techniques. *Thin Solid Films* 2005, 502, 205-211.
20. Ghosh, S. K. & Pal, T. Interparticle coupling effect on the surface plasmon resonance of gold nanoparticles: From theory to application. *Chem. Rev.* 2007, 107, 4797-4862.
21. Halas, N.J., Lal, S., Chang, W.-S., Link, S. & Nordlander, P. Plasmon in strongly coupled metallic structures. *Chem. Rev.* 2011, doi:10.1021/cr200061k.
22. Zum Felde, U., Haase, M. & Weller, H. Electrochromism of highly doped nanocrystalline SnO:Sb. *J. Phys. Chem. B* 2000, 104, 9388-9395.
23. Pflughoefft, M. & Weller, H. Spectroclectrochemical analysis of the electrochromism of antimony-doped nanoparticulate tin-dioxide electrodes. *J. Phys. Chem. B* 2002, 106, 10530-10534.
24. Feiganbaum, E., Diest, K. & Atwater, H. A. Unity-order index change in transparent conducting oxides at visible frequencies. *Nano Lett.* 2010, 10, 21112116.
25. Lee, E. S. et al. "Advancement in Electrochromic Windows" (CEC-500-2006-052, California Energy Commission, PIER, Lawrence Berkeley National Laboratory, Berkeley, Calif., 2006).
26. Baetens, R., Jelle, B. P. & Gustavsen, A. Propeties, requirements and possibilities of smart windows for dynamic daylight and solar energy control in buildings: A state-of-the art review. *Sol. Energ. Mat. Sol. C.* 2010, 94, 87-105.
27. In fact, there is some suggestion in the literature that NiO-based electrochromic films, may in some cases operate on pseudocapacitive principles. For example, see: S. E. Lee, C. E. Tracy, Y. Yan, J. R. Pitts, S. K. Deb, Solid state nanocomposite electrochromic pseudocapacitors. *Electrochem. Sol. Stat. Lett.* 2005, 8, A188-A190.
28. O'Leary, S. K., Johnson, S. R. & Lim, P. K. The relationship between the distribution of electronic states and the optical absorption spectrum of an amorphous semiconductor: An empirical analysis. *J. Appl. Phys.* 1997, 82, 3334-3340.
29. Mergel, D. & Qiao, Z. Dielectric modelling of optical spectra of thin $In_2O_3$:Sn films. *J. Phys. D* 2002, 35, 794-801.
30. Hamberg, I. & Granqvist, C. G. Evaporated Sn-doped $In_2O_3$ films—basic optical—properties and applications to energy-efficient windows. *J. Appl. Phys.* 1986, 60, 123-159.
31. Gerlach, E. Carrier scattering and transport in semiconductors treated by the energy-loss method. *J. Phys. C.* 1986, 19, 4585-4603.

CONCLUSION

It is to be understood that the above description and examples are intended to be illustrative and not restrictive. Many embodiments will be apparent to those of skill in the art upon reading the above description and examples. The scope of the embodiments described herein should, therefore, be determined not with reference to the above description and examples, but should instead be determined with reference to the appended claims, along with the full scope of equivalents to which such claims are entitled.

What is claimed is:

1. An electrochromic device, comprising:
   an electrochromic film comprising transparent conducting oxide (TCO) nanostructures located over a substrate;
   an electrolyte; and
   a counter electrode,
   wherein an absorbance peak of the electrochromic film is at a first wavelength in an infrared wavelength range at open circuit voltage, and the absorbance peak of the electrochromic film is configured to shift to a second wavelength in the infrared range which is different from the first wavelength in response to an applied bias which is different from the open circuit voltage.

2. The device of claim 1, wherein the absorbance peak of the electrochromic film shifts to the second wavelength due to corresponding shift of a surface plasmon resonance peak of the TCO nanostructures in response to the applied bias.

3. The device of claim 1, wherein the device comprises a smart window.

4. The device of claim 1, wherein the TCO nanostructures comprise doped metal oxide nanocrystals.

5. The device of claim 4, wherein the nanostructures are embedded in the electrolyte resulting in an electrolyte—nanostructure mixture positioned above the substrate, and the counter electrode is positioned above the mixture.

6. The device of claim 1, wherein the electrolyte comprises a polymer.

7. The device of claim 1, wherein the electrolyte comprises a gel.

8. A method of operating an electrochromic device, comprising:
   providing the electrochromic device comprising an electrochromic film comprising transparent conducting oxide (TCO) nanostructures, an electrolyte and a counter electrode, wherein an absorbance peak of the electrochromic film is at a first wavelength in an infrared wavelength range at open circuit voltage; and applying a bias to the device to shift the infrared absorbance peak of the electrochromic film to a second wavelength different from the first wavelength, wherein the bias is different from the open circuit voltage.

9. The method of claim 8, wherein the absorbance peak of the electrochromic film shifts from the first to the second wavelength due to corresponding shift of a surface plasmon resonance peak of the TCO nanostructures in response to the application of the bias.

10. The method of claim 8, wherein the device comprises a smart window.

11. The method of claim 8, wherein the electrolyte comprises a polymer.

12. The method of claim 8, wherein the electrolyte comprises a gel.

13. The method of claim 8, wherein the TCO nanostructures comprise doped metal oxide nanocrystals.

14. The method of claim 13, wherein the nanostructures are embedded in the electrolyte resulting in an electrolyte—nanostructure mixture positioned above the substrate.

15. The method of claim 14, further wherein the counter electrode and a second substrate are positioned above the mixture.

* * * * *